(12) United States Patent
Yabuki et al.

(10) Patent No.: US 7,401,478 B2
(45) Date of Patent: Jul. 22, 2008

(54) MANUFACTURING METHODS OF DOUBLE-SPIRAL ARC TUBES

(75) Inventors: Tatsuhiro Yabuki, Takatsuki (JP); Noriyuki Uchida, Hirakata (JP); Takayuki Iwasaki, Katano (JP); Shiro Iida, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 520 days.

(21) Appl. No.: 10/813,890

(22) Filed: Mar. 31, 2004

(65) Prior Publication Data
US 2004/0231365 A1    Nov. 25, 2004

(30) Foreign Application Priority Data
Apr. 9, 2003 (JP) ............... 2003-105156
Mar. 16, 2004 (JP) ............... 2004-073962

(51) Int. Cl.
C03B 23/24     (2006.01)
C03B 23/26     (2006.01)
C03B 23/045    (2006.01)
C03B 23/051    (2006.01)
C03B 23/06     (2006.01)
H01J 17/16     (2006.01)
H01J 61/30     (2006.01)

(52) U.S. Cl. ............... 65/109; 65/108; 65/110; 65/292; 313/634

(58) Field of Classification Search .......... 65/108, 65/110
See application file for complete search history.

(56) References Cited

U.S. PATENT DOCUMENTS
2,491,857 A * 12/1949 Greiner ............... 65/108

FOREIGN PATENT DOCUMENTS
CN    99120969.9    11/1999
DE    19855240      5/2000
JP    08-339780     12/1996

OTHER PUBLICATIONS

"Gear Ratio", (http://en.wikipedia.org/wiki/Gear_ratio), Accessed Dec. 20, 2006—Cited to show the well established principles of gear ratios and rate of rotation.*
English Language Translation of DE 198 55 240 A1 to Holzer et. al., "Method for production of spiral glass coils for incandescent lamps with axis-parallel ends", Published May 31, 2000, pp. 1-8.*

* cited by examiner

*Primary Examiner*—Steven P. Griffin
*Assistant Examiner*—Jason L. Lazorcik

(57) ABSTRACT

The manufacturing method comprises: a softening step of softening a straight glass tube in a heating furnace; a moving and placing step of moving the softened glass tube so that the glass tube is placed on the top of the mandrel; and a winding step of winding the glass tube placed on the top of the mandrel around the periphery of the mandrel. The mandrel is disposed beneath the glass tube starting to get soft, and the glass tube being soft is perpendicularly lowered in order to be placed on the top of the mandrel. In the winding step, the winding speed Vr at which the glass tube is wound around the mandrel is higher than the moving speed Vs at which chuck units holding the ends of the glass tube move toward the mandrel.

17 Claims, 15 Drawing Sheets

MANUFACTURING METHODS OF DOUBLE-SPIRAL ARC TUBES

This application is based on the applications No. 2003-105156 and No. 2004-73962 filed in Japan the content of which is hereby incorporated by reference.

BACKGROUND OF THE INVENTION

1. Field of the Invention

The present invention relates to manufacturing methods of double-spiral arc tubes and to double-spiral arc tubes that are each formed by hanging and holding the substantially center of a softened glass on the top of a mandrel and winding the glass tube around the periphery of the mandrel.

2. Description of the Related Art

As an energy-saving era has started, low-pressure mercury discharge lamps that have high lamp efficiency and long lives, especially fluorescent lamps, have been attracting attentions. The inventors of the present invention have been studying the possibility of applying a glass tube bent into a double spiral to an arc tube used in such a fluorescent lamp. The advantageous effect of forming an arc tube into a double spiral is that this kind of arc tube has a longer discharge path and higher light-emission luminous flux than an arc tube that is of the equal size on the exterior, e.g. an arc tube including three U-shaped glass tubes that are joined together. The following describes manufacturing methods of a double-spiral arc tube. (For example, see the Japanese Unexamined Patent Application Publication No. 08-339780.)

FIGS. 1A and 1B show the process of bending a straight glass tube into a double spiral. FIG. 2 shows the positional relationship between a heating furnace and a mandrel.

As shown in FIG. 2, the heating furnace and the mandrel have a positional relationship by which the mandrel is disposed in front of the heating furnace so that the axis of the mandrel extends perpendicularly.

The following explains the process of forming a double spiral.

First, a glass tube 900 is heated with the use of a heating furnace 910, which could be an electric furnace. This heating process is performed, as shown in FIG. 1A, by placing an intermediate portion of the glass tube 900, which is to be formed into a double spiral, inside the heating furnace 910, and heating it until the intermediate portion gets soft.

When the intermediate portion of the glass tube 900 placed inside the heating surface 910 has become soft, the glass tube 900 is taken out of the heating furnace 910 by holding both ends thereof. The glass tube 900 is moved (in the direction indicated by the arrow) from the heating furnace 910 to above the mandrel 920 disposed in front of the heating furnace 910, like the glass tube 900a shown with the imaginary lines in FIG. 2. The glass tube is then positioned with the top 921 of the mandrel 920, like the glass tube 900b shown with the other imaginary lines in FIG. 2.

As shown in FIG. 2, the mandrel 920 has, at the top 921 thereof, a pair of hook units 923 and 924 by which the glass tube 900 is hung and held. As shown in FIG. 1B, the mandrel 920 also has, on the periphery thereof, winding grooves 922 along which the intermediate portion of the glass tube 900 is to be wound so as to be formed into a desired double spiral.

After the central portion 901b of the glass tube 900, shown in FIG. 2, is positioned between the pair of hook units 923 and 924, the mandrel 920 is rotated in the B2 direction as well as shifted (or moved) in the C direction, as shown in FIG. 1B.

As a result of the rotation of the mandrel 920, the glass tube 900 is hung and fixed on the hook units 923 and 924 positioned on the top 921 of the mandrel 920. Also as a result of the rotation and the shift of the mandrel 920, the glass tube 900 is wound along the winding grooves 922 on the mandrel 920.

It should be noted that the glass tube 900 is inflated during the winding process by nitrogen gas with a constant pressure being sent into the glass tube 900 from the ends, which is hung and held by the hook units 923 and 924 of the mandrel 920. With this arrangement, a portion of the outer surface of the glass tube 900 that is positioned on the winding grooves side is made abut on the wall surface of on the winding grooves 922 on the periphery of the mandrel 920, so that the cross sectional shape of the glass tube 900 conforms to the cross sectional shape of the winding grooves 922 of the mandrel 920.

When the glass tube 900 being wound around the mandrel 920 has made transition from the soft state to a hard state due to a temperature fall, the mandrel 920 is rotated in the reverse direction of the B2 direction, and the glass tube 900 being wound is removed from the mandrel 920. Thus, a glass tube 950 formed into a double spiral as shown in FIG. 1C is obtained.

Thereafter, various kinds of processing are applied to the obtained glass tube 950 according to methods that are publicly known. The processing includes: removal of the ends of the glass tube 950; application of a phosphor onto the inner surface of the glass tube 950; and enclosing and attaching electrodes at the ends of the glass tube 950. Thus, an arc tube will be obtained.

According to a conventional manufacturing method, however, there have been products with defects frequently because, for example, the glass tube 900 has not properly been wound along the winding grooves 922 of the mandrel 920, or even if the glass tube 900 has been properly wound, the double spiral happens to be deformed.

More specifically, there have been many cases where, when the glass tube 900 is wound around the mandrel 920, the glass tube 900 comes out of the winding grooves 922 of the mandrel 920, as shown in FIG. 3 (indicated with "954").

In another case, as shown in FIG. 4, although the glass tube 950 is formed into a double spiral, the circumferential diameter of the double spiral gets large in some part (indicated with "951"), or the diameter of the glass tube gets small in some part (indicated with "952", or, to the contrary, the diameter of the glass tube gets large in some part (indicated with "953").

As a result of manufacturing arc tubes as trial mass-production by a conventional manufacturing method, the incidence ratio of having defective products as mentioned above during the process of forming straight glass tubes into double spirals was approximately 50 percent.

SUMMARY OF THE INVENTION

In view of the aforementioned problem, an object of the present invention is to provide a manufacturing method of an arc tube by which it is possible to reduce products with defects.

In order to achieve the object, the present invention provides a manufacturing method of a double-spiral arc tube formed by hanging a straight glass tube being softened by heat with a substantially center thereof being held on a top of a mandrel and winding a remaining part of the glass tube along winding grooves on the periphery of the mandrel, the manufacturing method being characterized with that the mandrel is disposed beneath the straight glass tube starting to be softened, and the glass tube in a soft state is perpendicularly lowered so as to be hung and held on the top of the mandrel.

The expression used here "to lower the glass tube perpendicularly" means to move the glass tube downward substantially perpendicularly. The expression "a double spiral" denotes not only (i) a structure in which each of portions of the glass tube from a turning part, where the glass tube is bent and turned, up to both ends of the glass tube is spirally wound, but also (ii) a structure in which each of portions of the glass tube is spirally wound around a spiral axis from the turning part up to each of certain points before the ends thereof, and each of portions between the certain points and the ends extends parallel to the spiral axis.

Further, the shape of the glass tube before the softening step is not limited. It is acceptable if, for example, the glass tube is straight, or the glass tube is shaped like an arc.

According to the manufacturing method of the present invention, even if the central portion of the softened glass tube sags because of being soft, the direction of sagging is the same as the direction in which the glass tube is moved; therefore, it is easy to position the central portion with the mandrel. Accordingly, it is possible to start winding the glass tube around the mandrel before the temperature of the glass tube falls.

In other words, even if the glass tube being in a soft state sags while being lowered perpendicularly, the direction of sagging matches the direction of moving the glass tube; therefore, it is possible to make sway of the sagging portion smaller, as well as to place the glass tube on the top of the mandrel by merely lowering the glass tube perpendicularly, because the mandrel is disposed at a position toward which the glass tube is moved.

As a result, it is possible to make the period of time between when the glass tube starts getting soft and when the glass tube is placed on the mandrel substantially regular. Thus, it is possible to easily and accurately manage the temperature of the glass tube being wound around the mandrel, and to wind the glass tube around the mandrel under substantially the same conditions. Accordingly, it is possible to prevent the diameter of the glass tube formed into a double spiral from being too large or too small, for instance, as observed in the products manufactured by a conventional manufacturing method.

Further, the present invention provides a manufacturing method of a double-spiral arc tube formed by hanging a softened glass tube with a substantially center thereof being held on a top of a mandrel and winding a remaining part of the glass tube along winding grooves on the periphery of the mandrel, the manufacturing method characterized with that the ends of the glass tube being in a soft state are held by chuck units which each move toward the mandrel as the glass tube is wound around the mandrel, and a first speed at which the glass tube is wound around the mandrel is higher than a second speed at which the chuck units move.

According to this method, a tension load acts the glass tube during the winding process; therefore, it is possible to prevent the glass tube diameter from being varied. More specifically, a tension load constantly acts on the glass tube in the lengthwise direction; therefore, it is possible to wind the glass tube around the periphery of the mandrel without having it loose, and to prevent the outside diameter of the glass tube formed into a double spiral from getting large at some part.

BRIEF DESCRIPTION OF THE DRAWINGS

These and other objects, advantages and features of the invention will become apparent from the following description there of taken in conjunction with the accompanying drawings which illustrate a specific embodiment of the invention.

In the drawings.

DESCRIPTION OF THE PREFERRED EMBODIMENTS

The following explains an embodiment in which the present invention is applied to an arc tube in a compact self-ballasted fluorescent lamp, with reference to the drawings FIGS. 5 through 14.

1. Structure (1) Overall Structure

Figure 1C:
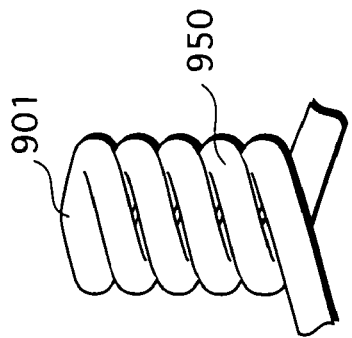
FIGS. 1A, 1B and 1C are drawings that schematically describe a conventional manufacturing method.
Figure 1B:
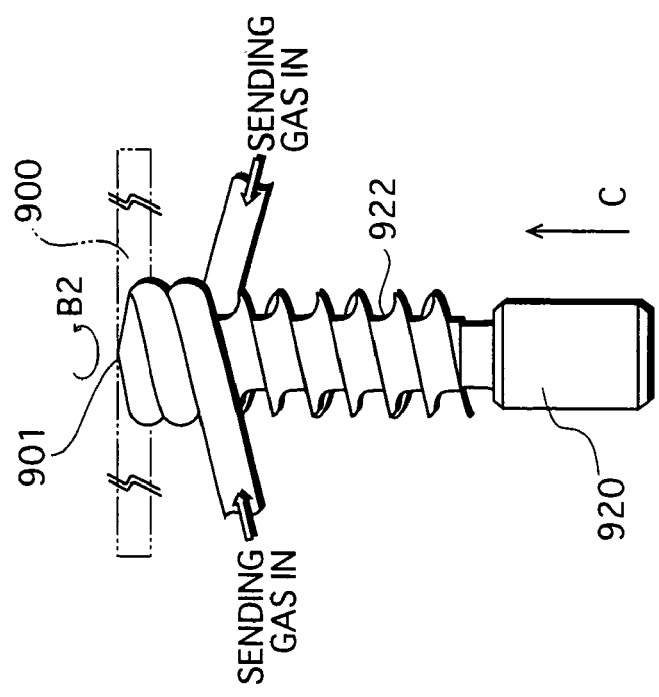
Figure 1A:
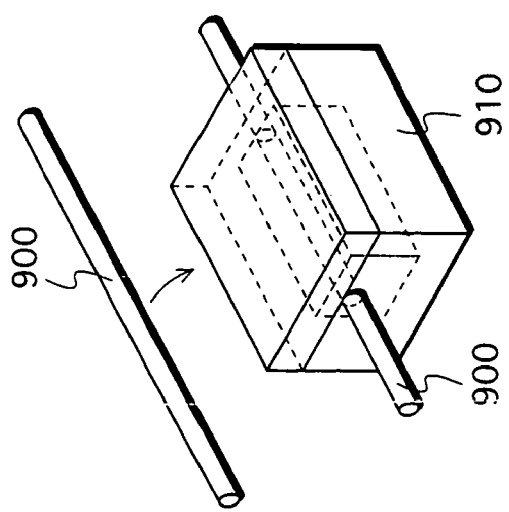
Figure 2:
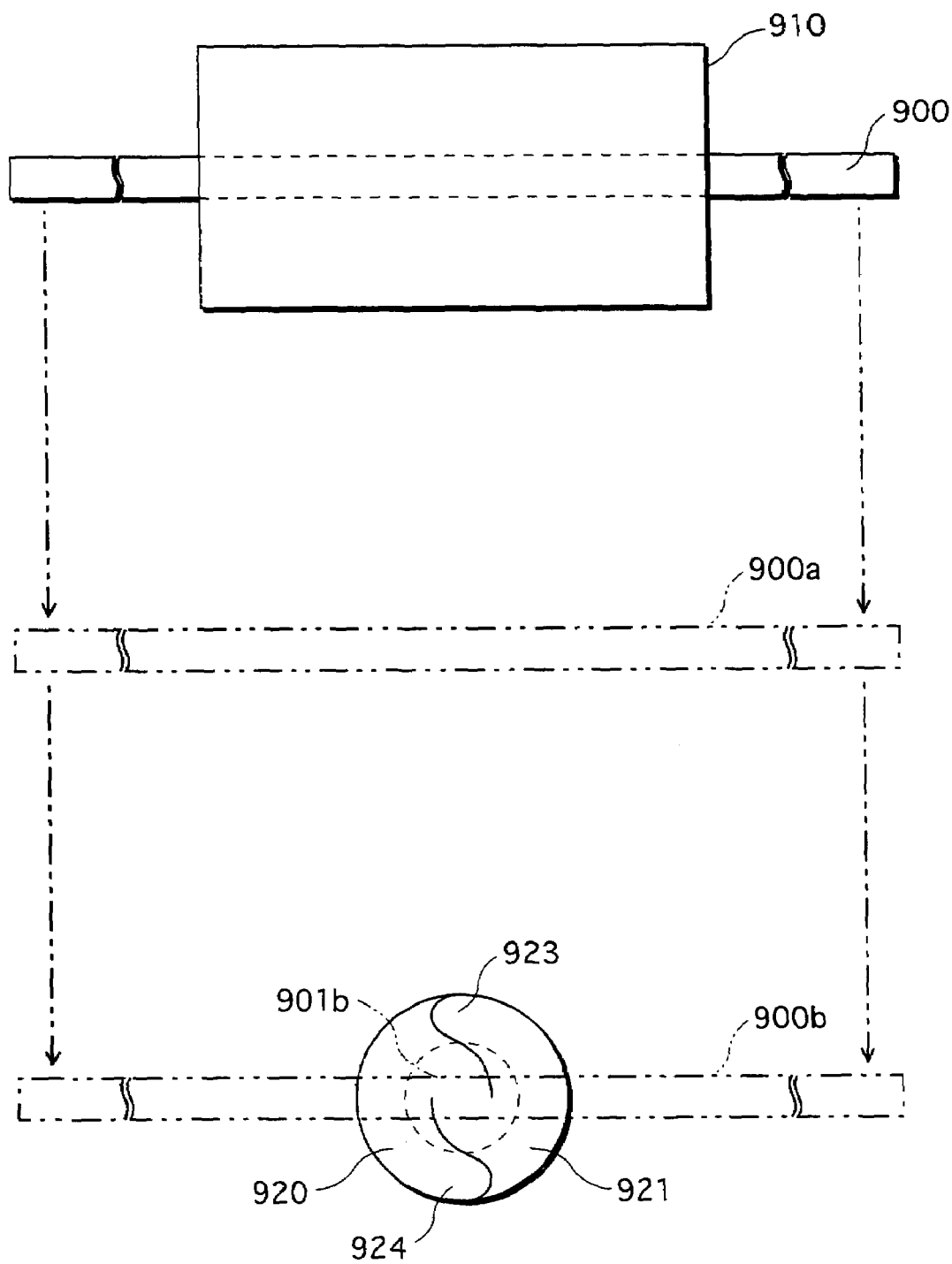
FIG. 2 shows the positional relationship between a heating furnace and a mandrel in a conventional manufacturing method.
Figure 3:
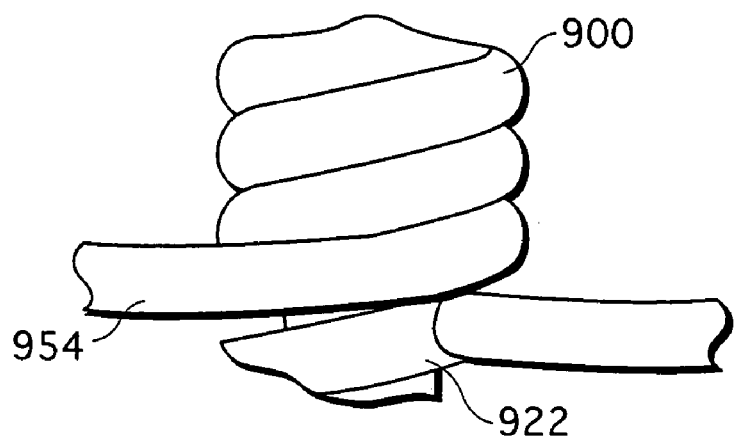
FIG. 3 shows a glass tube coming out of a winding groove of the mandrel in the winding step of a conventional manufacturing method.
Figure 4:
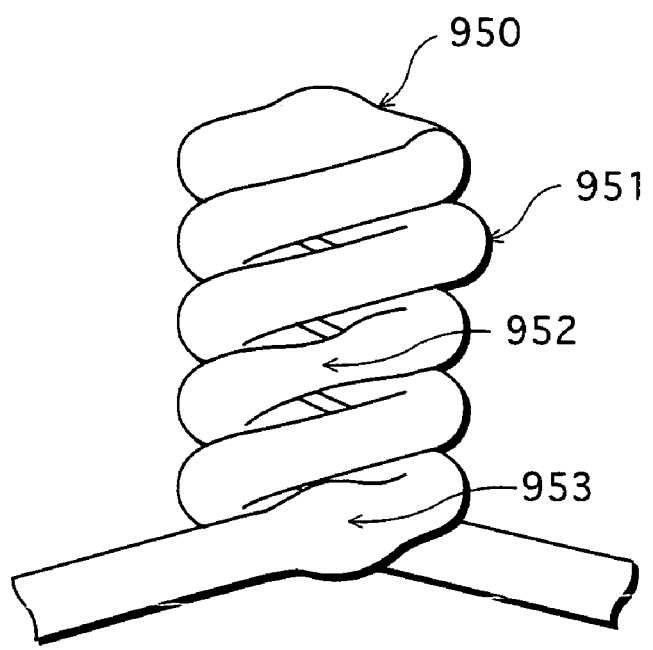
FIG. 4 shows examples of defects in a double-spiral glass tube formed by a conventional manufacturing method.
Figure 5:
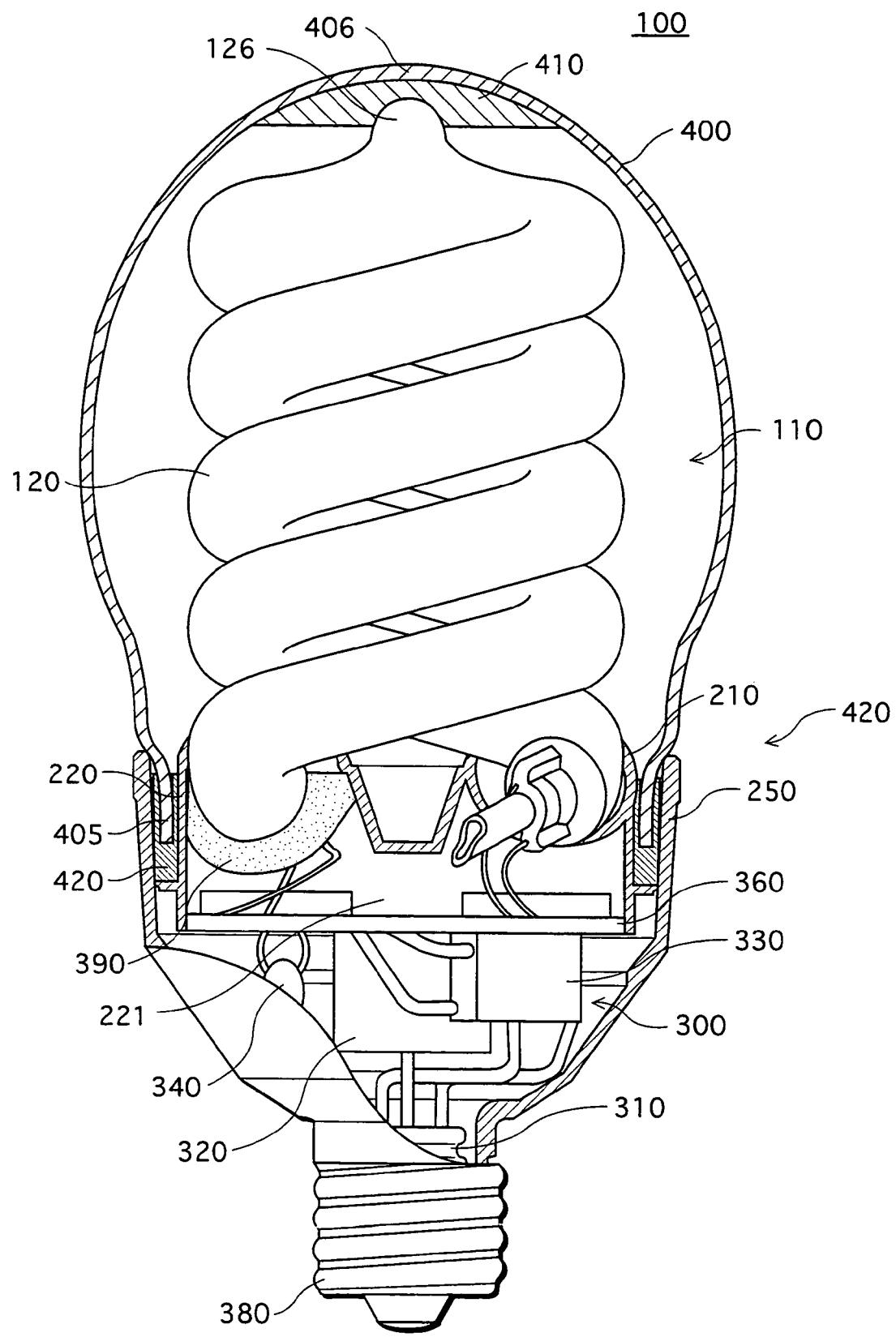
FIG. 5 is a partially cut-out front view of a compact self-ballasted fluorescent lamp which includes an arc tube manufactured by the manufacturing method of an embodiment of the present invention.

As shown in FIG. 5, the compact self-ballasted fluorescent lamp 100 comprises an arc tube 110, which is formed by bending a glass tube 120 into a double spiral; a holding member 210 in the shape of a bottomed cylinder for holding the arc tube 110; an electronic ballast 300 for turning on the light in the arc tube 110; a case 250 that is cone-shaped and fitted to the circumferential wall 220 of the holding member 210 so as to cover the electronic ballast 300; and a globe 400 that covers the arc tube 110. A base 380, which is the same type as one in an incandescent lamp, is attached to the lower side (the side that is opposite to the one into which the holding member 210 is fitted) of the case 250.

The electronic ballast 300 is structured with electrical parts including capacitors 310, 330, 340, and a choke coil 320, and uses a series inverter method. A substrate 360 on which these electrical parts are mounted is attached to the holding member 210.

The globe 400 is, like an incandescent lamp, made of a glass material with high decorativeness and is in the shape of an eggplant, which is so-called A-type. It should be noted that although the globe 400 is in the A-type shape here, the present invention is not limited to this. Also, it is also acceptable if no globe is used.

The globe 400 is attached by inserting the end 405 on the opening side of the globe 400 into the gap between the circumferential wall 220 of the holding member 210 and the circumferential wall of the case 250, which is fitted to the circumferential wall 220. It should be noted that the globe 400 is fixed by the adhesive 420, with which the gap between the holding member 210 and the case 250 is filled.

The inner surface at the top 406 (the upper side of FIG. 5) of the globe 400 is thermally joined with the projection 126 formed at the top (the upper side of FIG. 5) of the glass tube 120 via a heat conductive medium 410, namely a silicon resin.

(2) Arc Tube a. Structure

First, explanation will be provided on the structure of the arc tube 110.

Figure 6:
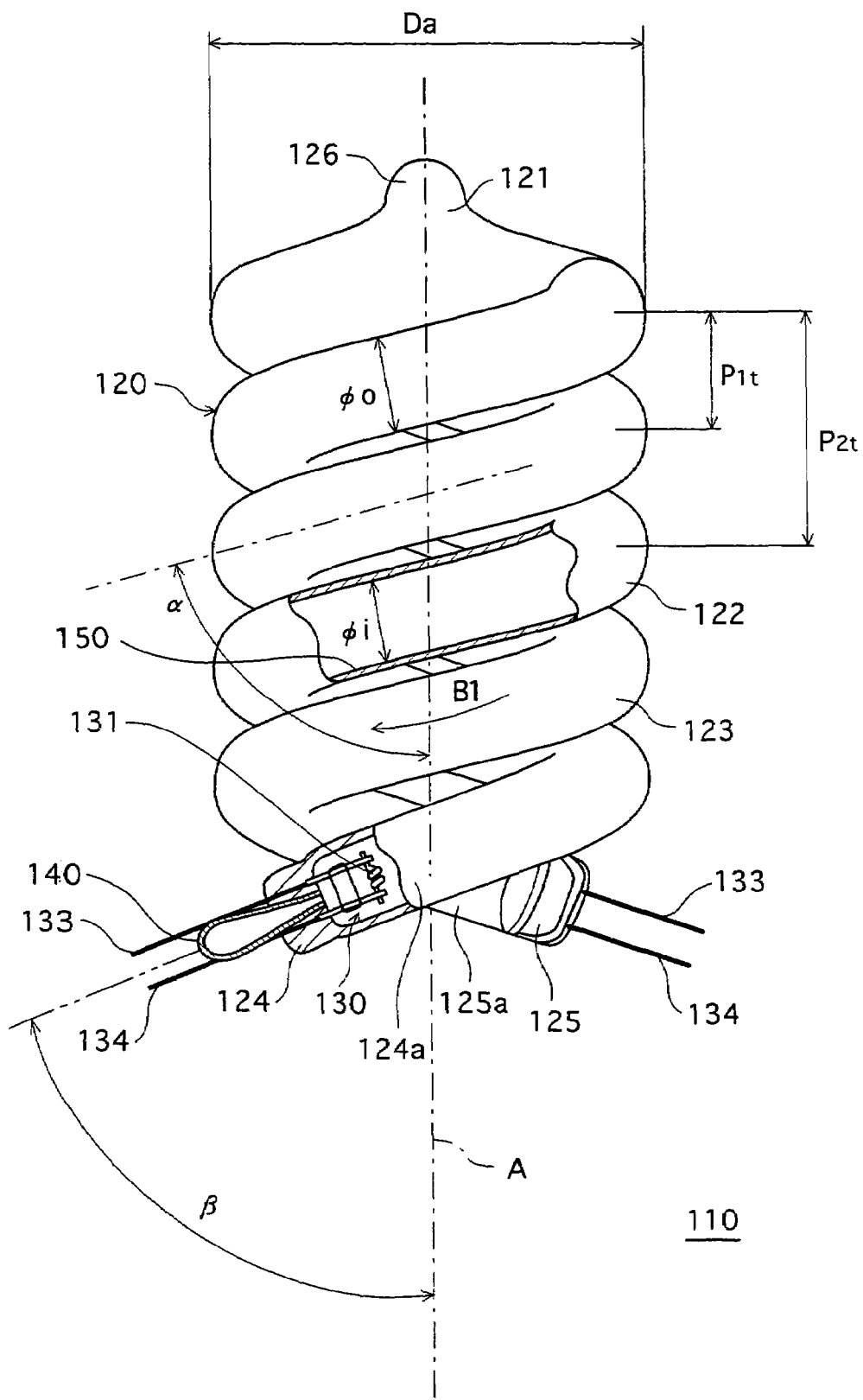
FIG. 6 is a partially cut-out front view of an arc tube manufactured by the manufacturing method of the embodiment.

As shown in FIG. 6, the arc tube 110 has a double-spiral structure which is made up of at least a turning part 121 and two spiral parts 122 and 123. The turning part 121 is formed by bending and turning the glass tube 120 at the center thereof. The two spiral parts 122 and 123 are formed by spirally winding portions from the turning part 121 up to the ends 124 and 125, around the spiral axis A in the B1 direction (hereafter this direction will be also referred to as "the winding direction"). A direction parallel to the spiral axis A will be referred to as "the spiral axis direction".

Each of portions of the glass tube 120 from the turning part 121 up to predetermined points (hereafter, these points will be referred to as "the pitch increasing points" and they will be explained in detail later) is spirally wound with a first spiral pitch, which is substantially regular. Each of portions of the glass tube 120 from the pitch increasing points up to the ends 124 and 125 (hereafter, these portions will be also referred to as "the end-side portions") is wound with a second spiral pitch, which is larger than the first spiral pitch, in such a manner that each of the ends 124 and 125 is more distant in the spiral axis direction from a portion of the glass tube 120 that is positioned adjacent to the end in the spiral axis direction. It should be noted that each of the spiral pitches mentioned here is a distance between the centers of two portions of the glass tube that is measured in the cross section, the two portions being positioned adjacent to each other in the spiral axis direction (indicated as P1t in FIG. 6).

More specifically, each of the portions of the glass tube 120 from the turning part 121 up to the pitch increasing points, is wound with inclination at an angle (hereafter this angle will be referred to as "a spiral angle") of $\alpha$ to the spiral axis A.

Each of the end-side portions of the glass tube 120 is wound with inclination at an angle of $\beta$, which is smaller than the spiral angle $\alpha$, to the spiral axis A.

On each of the ends 124 and 125 of the glass tube 120, an electrode 130 is enclosed and attached, the electrode 130 including a filament coil 131 made of tungsten and a pair of lead wires 133 and 134 that holds the filament coil 131 across by a bead glass mounting method.

On one end 124 of the glass tube 120, an exhaust pipe 140 is attached at the same time as the electrode 130 is enclosed and attached. The exhaust pipe 140 is used for vacuumizing the inside of the glass tube 120 and for enclosing mercury and a buffer gas, which are to be mentioned later. A tip of the exhaust pipe 140 being on the end that is not joined with the glass tube 120 is to be sealed by, for example, a tip-off method, after the inside of the glass tube 120 is exhausted, and mercury and a buffer gas are enclosed.

Inside the glass tube 120, argon as a buffer gas is enclosed at 600 Pa, along with approximately 5 mg of mercury. As additional information, it is acceptable to use a mixed gas as the buffer gas, for example, a mixture of argon and neon.

A phosphor 150 of rare-earth elements is applied to the inner surface of the glass tube 120. As for the phosphor 150, it is acceptable to use, for example, three kinds that emit light in red ($Y_2O_3$:Eu), green ($LaPO_4$:Ce, Tb) and blue ($BaMg_2Al_{16}O_{27}$:Eu, Mn), respectively.

b. Specific Examples

The arc tube 110 of the present embodiment is used in a compact self-ballasted fluorescent lamp 100, which corresponds to a 60 W incandescent lamp. Accordingly, since the arc tube 110 requires an amount of light that corresponds to that of a 60 W incandescent lamp, it is arranged so that the total number of the spiral turns made by the spiral parts 122 and 123 together is four and a half.

The compact self-ballasted fluorescent lamp 100 is smaller than an incandescent lamp in size. The circumferential diameter Da of the arc tube 110, i.e. the diameter measured from one outermost point to the other outermost point of the spirally wound glass tube 120, is 36.5 mm. The inside diameter $\phi i$ of the glass tube 120 is 7.4 mm. The outside diameter $\phi o$ of the glass tube 120 is 9 mm.

For the glass tube 120, which is included in the arc tube 110, a soft glass such as a strontium-barium silicate glass is used, for example. The total length of the glass tube 120 is 390 mm. Each of the pitch increasing points of the double-spiral glass tube 120 is at a position turned 90 degrees around the spiral axis A from each of the ends 124 and 125 of the glass tube 120 toward the turning part 121.

In each of the portions of the glass tube 120 from the turning part 121 up to the pitch increasing points, the pitch P2t between the two spiral parts positioned adjacent to each other in the spiral axis direction (vertical direction in FIG. 6) is 20 mm, the two spiral parts being either the spiral parts 122 and 122 or the spiral parts 123 and 123. In each of the same portions, the pitch P1t between the spiral part 122 and the spiral part 123 that are positioned adjacent to each other in the spiral axis direction is 10 mm.

With this arrangement, the minimum distance between two portions of the glass tube 120 that are positioned adjacent to each other in the spiral axis direction is approximately 1 mm. It is desirable to arrange it so that the distance is 3 mm or smaller. One reason for this arrangement is that, when the distance is larger than 3 mm, the total length of the arc tube 110 gets long. Also, another reason is that, when the portions of the glass tube 120 that are positioned adjacent to each other become more distant from each other in the spiral axis direction, there tends to be variations in luminance.

The spiral angle α in each of the portions of the glass tube 120 from the turning part 121 up to the pitch increasing points is approximately 76.7 degrees. The spiral angle β in each of the portions of the glass tube 120 from the pitch increasing points up to the ends 124 and 125 is approximately 69.2 degrees.

2. The Manufacturing Method of the Arc Tube

The following describes the manufacturing method of the arc tube of the present invention, particularly a method of forming a straight glass tube into a double spiral.

Figure 7A:
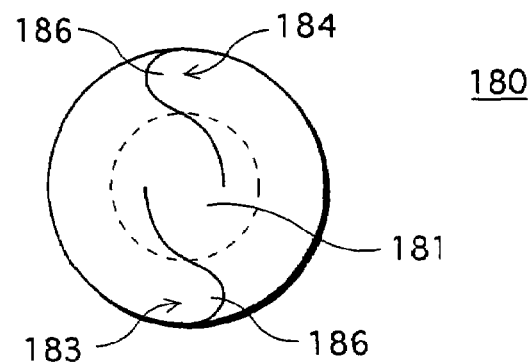
FIG. 7A is a plan view of a mandrel used in the manufacturing method of the embodiment.
Figure 7B:
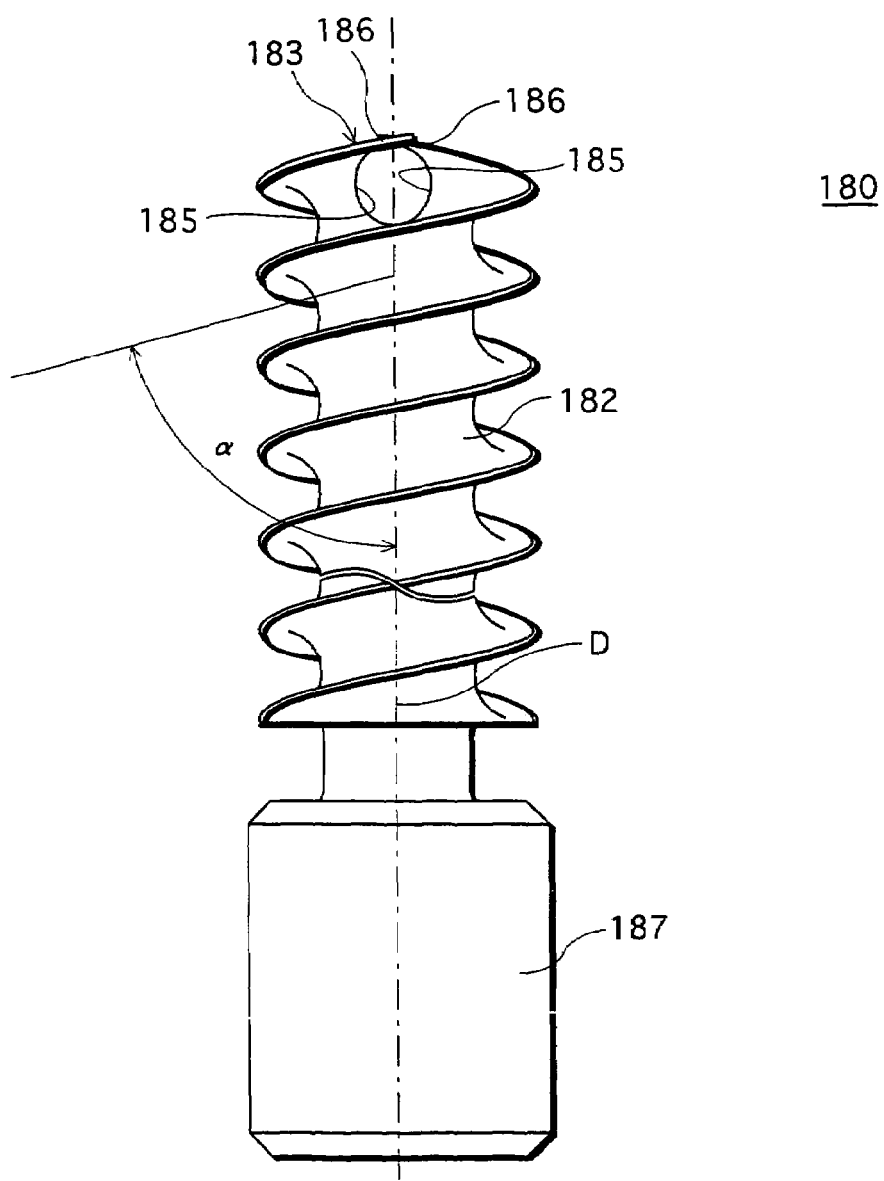
FIG. 7B is a front view of the mandrel.

Firstly, explanation is provided on a mandrel 180 around which a glass tube 160 is to be wound. FIG. 7A is a plan view of the mandrel 180. FIG. 7B is a front view of the mandrel 180.

As shown in FIGS. 7A and 7B, the mandrel 180 is in the shape of a circular pillar, and has, on the periphery thereof, winding grooves 182, which are spirally formed. There are two winding grooves 182 and each of them (i) spirally extends from the top 181 of the mandrel 180 toward the base thereof (the lower part) and (ii) is inclined at an angle α to the axis of the mandrel. The angle α, which is inclination angle of each winding grooves, corresponds to the spiral angle of the glass tube.

At the top 181 of the mandrel 180, a pair of hook units 183 and 184 is provided, on which the central portion of the glass tube is to be hung and held, so that the glass tube does not come off the mandrel 180 during the winding process.

As shown in FIG. 7A, the pair of hook units 183 and 184 is positioned symmetrical with respect to the center of the top 181 (the point that conforms to the axis D of the mandrel 180) in a plan view.

Each of the hook units 183 and 184 is made up of: a turning unit 185 (see FIG. 7B) for bending and turning the glass tube in the vicinity of the central portion; and a catching unit 186 for preventing the glass tube in the vicinity of the central portion from coming off the top 181 of the mandrel 180 during the winding process.

The lower part of the mandrel 180 is an attachment part 187 to be attached to a driving apparatus (not shown in the drawing). The driving apparatus has a function of rotating the mandrel 180 on the axis D, while moving the mandrel 180 toward the direction of the top 181 (the upper side of FIG. 7B) along the axis D, as well as a function which is totally the reverse of this function.

The glass tube is placed on the top 181 of the mandrel 180 by positioning the glass tube between the pair of hook units 183 and 184.

Next, the following describes a method of manufacturing the glass tube which is formed into a double spiral.

Figure 8:
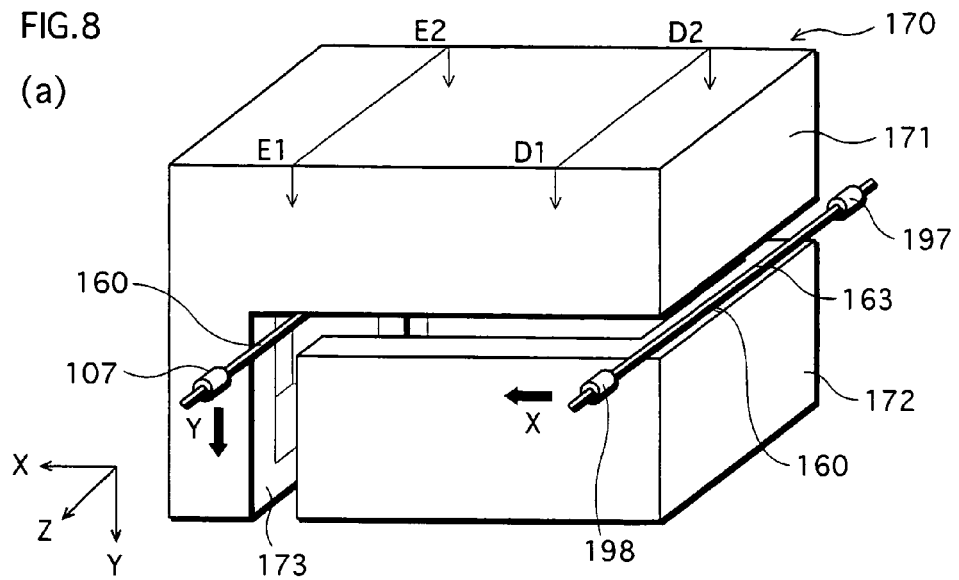
FIG. 8 is drawings that schematically describe the manufacturing method of the embodiment.
Figure 8:
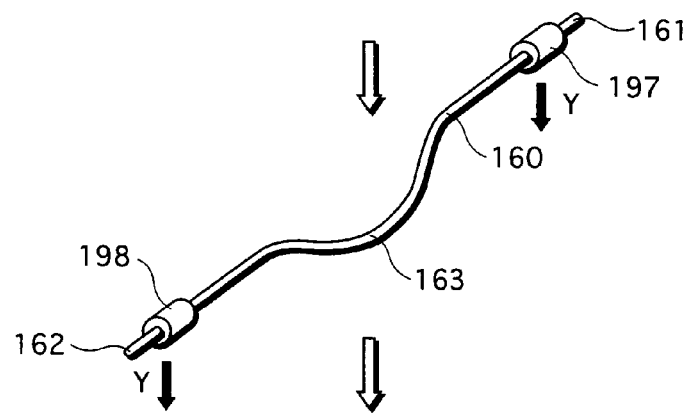
Figure 8:
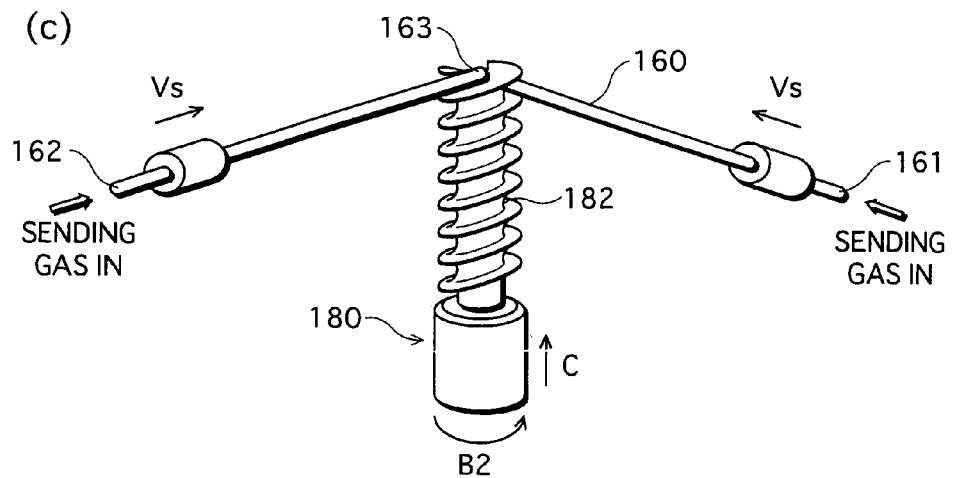

FIG. 8 is a drawing that schematically describes the manufacturing method of the glass tube which is formed into a double spiral.

In order to form a double spiral glass tube 120 by bending a straight glass tube 160, as shown in FIG. 8, four steps of processing are performed, such as (1) a softening step of softening the straight glass tube 160 in a heating furnace 170 (see FIG. 8(a)); (2) a moving and placing step of moving the softened glass tube 160 (see FIG. 8(b)) so as to place it on the top 181 of the mandrel 180; (3) a winding step of winding the glass tube 160 that has been placed on the top of the mandrel 180 around the periphery of the mandrel 180 (see FIG. 8(c)); (4) a removal step of removing the glass tube 160 that has been wound so as to form a double spiral from the mandrel 180.

It should be noted that, since the drawings in FIG. 8 and later are schematic drawings for explaining the manufacturing method, the glass tube, the heating furnace, the mandrel, and the like are out of proportion to their actual sizes.

The following explains each of the steps:

(1) Softening Step a. General Outline

In this step, the glass tube 160 gets softened by heat.

More specifically, as shown in FIG. 8(a), the ends 161 and 162 of the glass tube 160 are held by the chuck units 197 and 198 so that the tube axis is horizontal. It should be noted that the ends 161 and 162 are not softened. As the chuck units 197 and 198 move, a portion of the glass tube 160 positioned between the chuck units 197 and 198 is heated inside the heating furnace 170.

Here, the direction parallel to the tube axis of the straight glass tube 160 will be referred to as "the left-right direction" (the Z direction in FIG. 8(a)); the direction in which gravity acts on the glass tube 160 will be referred to "the up-and-down direction" (the Y direction in FIG. 8(a)); the direction that is orthogonal to the left-right direction and the up-and-down direction will be referred to as "the front-and-back direction" (the X direction in FIG. 8(a)).

b. Heating Furnace

The following explains the heating furnace 170 used for softening the glass tube 160.

As shown in FIG. 8(a), the heating furnace 170 includes a pair of heating units 171 and 172. The heating units 171 and 172 are disposed with a space therebetween, through which the glass tube 160 positioned horizontally is to be moved (hereafter, the space will be referred to as "the tunnel" and indicated with a reference number "173"). The tunnel 173 is in the shape of a tipped-over "L" so that the glass tube 160 first moves toward the back, and then downward.

c. Explanation on the Step

The following describes the step in which the glass tube 160 gets softened.

First, as shown in FIG. 8(a), the straight glass tube 160 moves in the front-and-back direction toward the back (in the X direction) from the entrance of the tunnel 173 of the heating furnace 170.

Figure 9A:
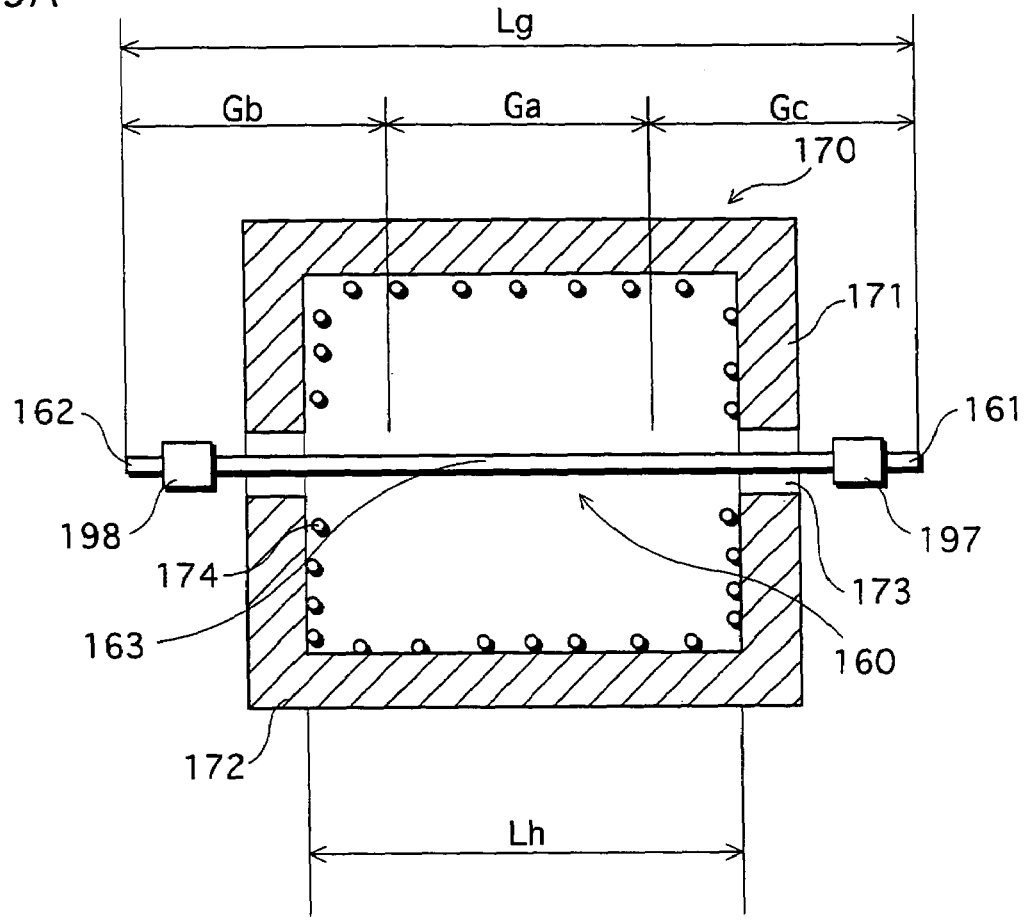
FIG. 9A is a cross sectional view of a heating furnace being sectioned in the up-and-down direction at the line D1-D2 in FIG. 8($a$) and viewed from a direction toward which the glass tube is moved.

FIG. 9A is a cross sectional view of the heating furnace 170 being sectioned in the direction indicated by the arrow (in the up-and-down direction) at the line D1-D2 in FIG. 8(a) and viewed from the direction toward which the glass tube 160 is moved (the X direction).

The temperature of the glass tube 160 does not reach the softening point while it is moved toward the back. The heater 174 heats up the glass tube 160 so that the more in the back the glass tube gets to, the higher the temperature of the glass tube gets. In other words, the temperature control of the inside of the heating furnace 170 is performed so that the temperature of the glass tube 160 increases up to close to the softening point while the glass tube 160 moves toward the back inside the heating furnace 170.

When the temperature of the glass tube 160 gets close to the softening point, the direction in which the glass tube 160 is moved changes from the front-and-back direction to the up-and-down direction (the Y direction in FIG. 8(a)).

Figure 9B:
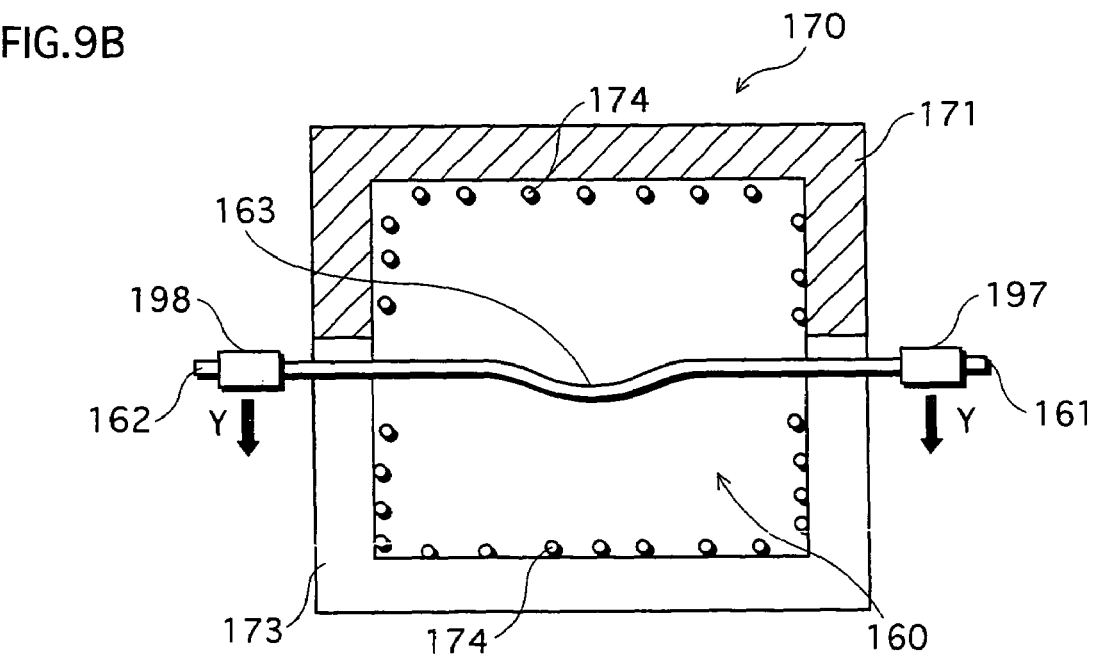
FIG. 9B is a cross sectional view of a heating furnace being sectioned in the up-and-down direction at the line E1-E2 in FIG. 8($a$) and viewed from a direction toward which the glass tube is moved.

FIG. 9B is a cross sectional view of the heating furnace 170 being sectioned in the direction indicated by the arrow (in the up-and-down direction) at the line E1-E2 in FIG. 8(a) and viewed from the direction toward which the glass tube 160 is moved (the X direction).

As shown in FIG. 9B, the glass tube 160 is heated by the heater 174 even while it is moved downward. Due to this arrangement, the glass tube 160 starts sagging from the central portion 163 thereof. The farther down the glass tube 160 gets, the longer the sagging portion becomes, in the lengthwise direction of the glass tube 160.

The expression "the tube axis direction" of the glass tube 160 is used when the tube axis of the glass tube 160 is straight. The expression "the lengthwise direction" of the glass tube 160 is used when the glass tube 160 is in a soft state and the tube axis is not straight.

d. Explanation in Detail The following explains the process of forming a glass tube 120 into a double spiral, which is to be used in the arc tube 110 included in the compact self-ballasted fluorescent lamp 100 mentioned above. The outside diameter of the straight glass tube 160 used in the forming process is 9.0 mm, and the inside diameter thereof is 7.4 mm. The total length Lg is 1160 mm. The intermediate portion, which is 390 mm in length and includes the central portion 163 of the glass tube 160 positioned substantially at the center of the intermediate portion, is to be formed into a double spiral.

As additional information, the total length of the glass tube 120 after being formed into a double spiral is 430 mm. The outside diameter φo is 9.3 mm. The inside diameter φi is 7.6 mm. The reason why the diameters and the total length are larger after the forming process is because the tube expands to have larger diameters due to the nitrogen gas sent into the glass tube 160 during the forming process, and the glass tube 160 gets elongated because of being soft.

An intermediate portion (Lh) of the straight glass tube 160, which is approximately 700 mm in length, gets heated inside the heating furnace 170. (This portion of the glass tube being heated will be referred to as "the heated portion".) The softening point of the glass tube 160 used in the embodiment is within a range of 670 to 690 degrees centigrade. The temperature is controlled so that the temperature of a portion of the glass tube 160 that is scheduled to be formed into a double spiral is 770 degrees centigrade (a heating target temperature) and the temperature varies in the lengthwise direction within a range of ±8 degrees centigrade of the heating target temperature inclusive. (The specific portion of the glass tube 160 to be formed into a double spiral will be referred to as "the double spiral scheduled portion" and is indicated with a reference symbol "Ga" in FIG. 9A.) The portions on either side of the double spiral scheduled portion Ga of the glass tube 160 will be referred to as "the non-forming portions", Gb and Gc (385 mm in length, each).

The double spiral scheduled portion Ga of the glass tube 160 having been heated and softened starts sagging gradually as shown in FIG. 9B. Out of the heated portion, the sagging portion (in the lengthwise direction of the glass tube) is approximately 550 mm in length and includes the double spiral scheduled portion Ga. The central portion 163 sags approximately 15 mm below a line that connects the chuck unit 197 with the chuck unit 198.

As explained so far, in this softening step, the double spiral scheduled portion Ga of the glass tube 160 starts sagging due to the heat. The direction of sagging, however, matches the direction in which the glass tube 160 is moved. Accordingly, there is no swaying in the front-and-back direction, which was a problem in a conventional manufacturing method, and it is easy to place the glass tube 160 on the top 181 of the mandrel 180.

(2) Moving and Placing Step a. General Outline

In this step, the glass tube 160 having been heated in the heating furnace 170 is moved to the top 181 of the mandrel 180 and placed on the top 181 of the mandrel 180.

Particularly, in this step, an arrangement is made so that (i) the central portion 163 of the glass tube 160 can be placed on the top 181 of the mandrel 180 immediately and also, (ii) the double spiral scheduled portion Ga of the glass tube 160 can be supplied to and parallel with the grooves 182 of the mandrel 180, before the winding step starts.

More specifically, firstly, the mandrel 180 is disposed so that it is beneath the exit of the tunnel 173 of the heating furnace 170, and the axis D (see FIG. 7B and FIG. 8(c)) of the mandrel 180 extends substantially perpendicularly. The glass tube 160 coming out of the heating furnace 170 is moved downward in the perpendicular direction. (Hereafter, this downward movement will be simply referred to as "to lower perpendicularly".)

Secondly, the ends 161 and 162 of the glass tube 160 are spread apart in the left-right direction while the glass tube 160 is being lowered perpendicularly, so that the central portion 163 of the glass tube 160 abuts and is placed on the top 181 of the mandrel 180.

Figure 11A:
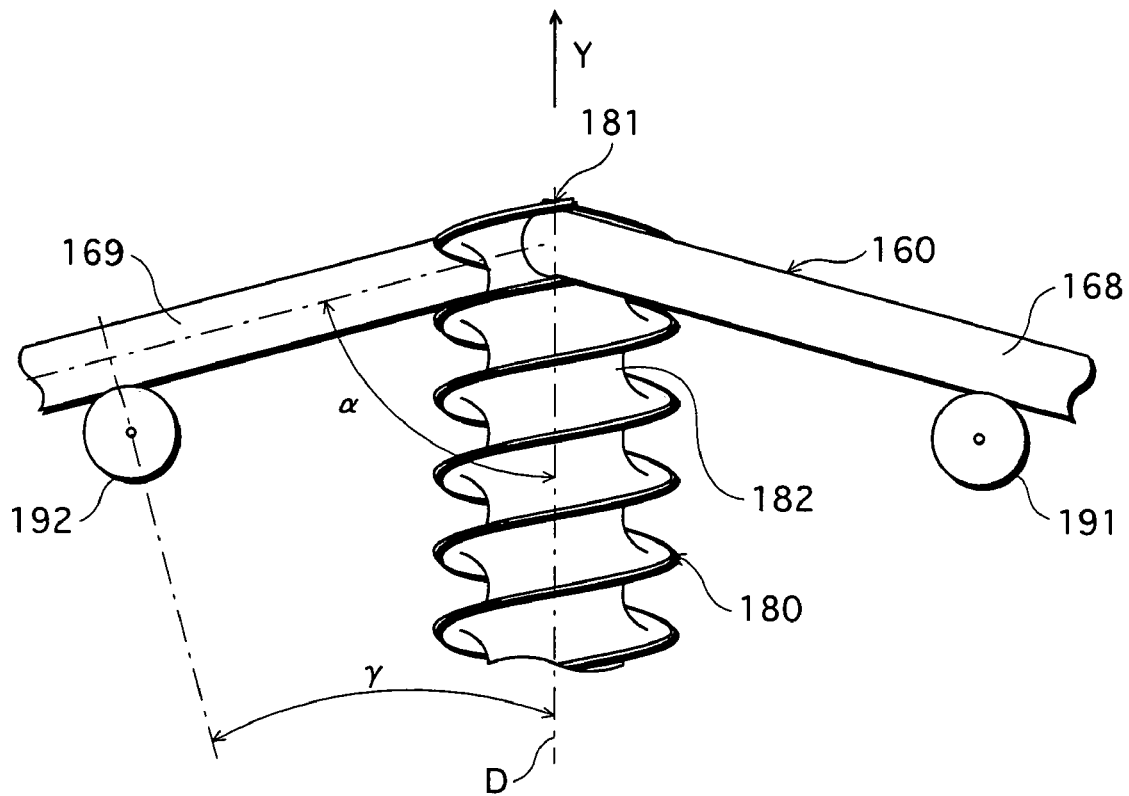
FIG. 11A is a front view showing that a glass tube being in a soft state is placed on the top of a mandrel.

Thirdly, an arrangement is made to the glass tube 160 placed on the top 181 of the mandrel 180 so that each of the portions between the central portion 163 and the ends 161 and 162 (hereafter these portions will be referred to as "the straight portions") is substantially straight, and also the angle between each of the straight portions 168 and 169 and the axis D of the mandrel 180 is the same as the spiral angle α of the glass tube 120 formed into a double spiral (See FIG. 11A). It should be noted that α is also the angle at which each of the winding grooves of the mandrel is inclined.

Figure 10:
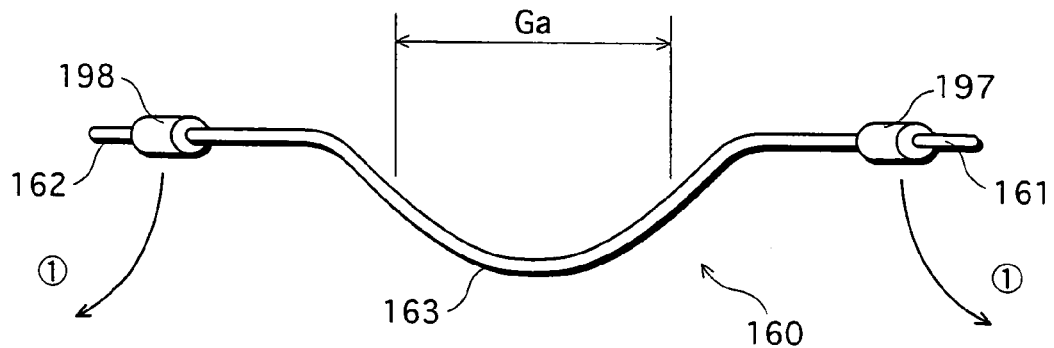
FIG. 10 shows the moving and placing step in the present manufacturing method.
Figure 10:
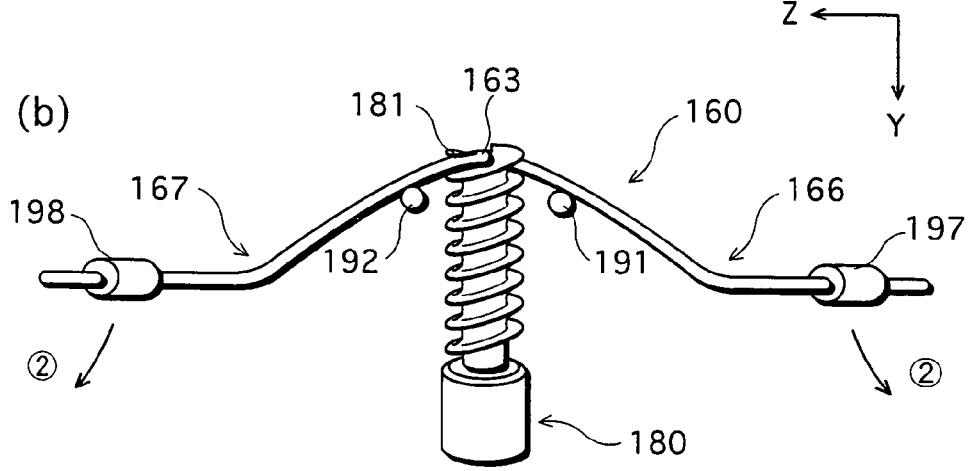
Figure 10:
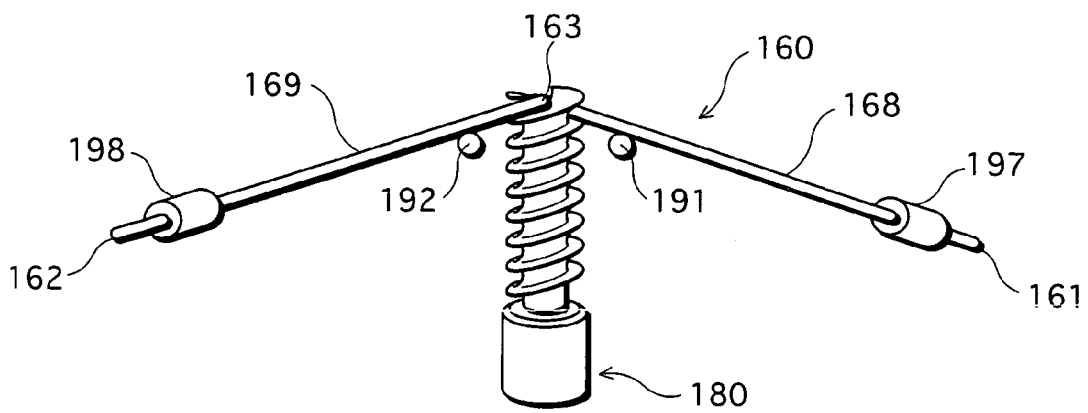

As shown in FIG. 10, a pair of supporting rollers 191 and 192 is provided in the vicinity of the mandrel 180, in order to maintain the straightness of the straight portions 168 and 169 of the glass tube 160.

Figure 11B:
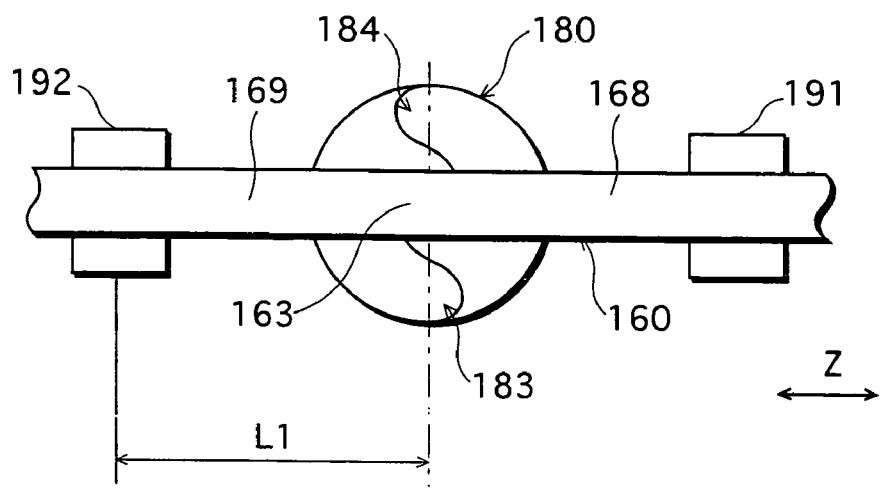
FIG. 11B is a plan view showing that a glass tube being in a soft state is placed on the top of a mandrel.

As shown in FIG. 11A, the supporting rollers 191 and 192 are disposed so that the upper surfaces of the supporting rollers 191 and 192 conform to the lower surfaces of the portions of the glass tube 160, respectively, the portions each being inclined at angle α to the axis D of the mandrel 180. Also, the supporting rollers 191 and 192 are disposed, as shown in FIG. 11B, on a line that conforms to the lengthwise direction (the Z direction) of the glass tube 160 when the glass tube 160 is viewed in a plan view. It should be noted that in the present embodiment, the supporting rollers 191 and 192 are disposed so that the axes of the supporting rollers 191 and 192 are each positioned at a predetermined distance L1 from the axis D of the mandrel 180 (See FIG. 11B).

b. Explanation on the Step

The following describes this step, mainly with reference to FIG. 10.

Firstly, the positions of the pair of hook units 183 and 184 of the mandrel 180 are adjusted so that the glass tube 160 being in a soft state can be placed between the pair of hook units 183 and 184 just by perpendicularly lowering the glass tube 160. More specifically, as shown in FIG. 11B, the mandrel 180 is rotated to make positional adjustments, so that the pair of hook units 183 and 184 of the mandrel 180 is positioned orthogonal to the lengthwise direction of the glass tube 160, in a plan view.

Then, the glass tube 160 having been heated in the heating furnace 170 is perpendicularly lowered while its posture is maintained, from the exit of the tunnel 173 of the heating furnace 170. With this arrangement, even if the double spiral scheduled portion Ga of the glass tube 160 gets softened and sags, the direction of sagging matches the direction in which the glass tube is moved; therefore, it is possible to make sway of the double spiral scheduled portion Ga in the front-and-back direction small.

Moreover, the top 181 of the mandrel 180 is disposed at a position that is in the direction toward which the glass tube 160 is to be perpendicularly lowered and corresponds to the central portion 163 of the glass tube 160; therefore, it is possible to place the central portion 163 of the glass tube 160 between the pair of the hook units 183 and 184 on the top 181 of the mandrel 180 by simply perpendicularly lowering the glass tube 160.

As a result, it is possible to make the period of time between when the glass tube 160 comes out of the heating furnace 170 and when the glass tube 160 is placed on the mandrel 180 substantially regular. Thus, it is possible to manage the temperature of the glass tube 160 being wound around the mandrel 180 so that the temperature is substantially regular, and it is possible to wind the double spiral scheduled portion Ga of the glass tube 160 around the mandrel 180 under a substantially same condition.

More specifically, the temperature of the central portion 163 of the glass tube 160 as the glass tube 160 comes out of the heating furnace 170 is approximately 770 degrees centigrade, whereas the temperature of the central portion 163 of the glass tube 160 as the glass tube 160 is placed on the mandrel 180 is approximately 750 degrees centigrade. It has been found out that the difference in the temperatures, i.e. 20 degrees centigrade, was substantially regular.

In addition, when the glass tube 160 coming out of the heating furnace 170 is perpendicularly lowered, the chuck units 197 and 198 that hold the ends 161 and 162 of the glass tube 160 respectively move in the left-right directions which make the chuck units 197 and 198 farther apart from each other, as indicated with ① in FIG. 10(*a*). In other words, when the central part 163 of the glass tube 160 is perpendicularly lowered so as to be positioned with the top 181 of the mandrel 180, the chuck units 197 and 198 are controlled so that the chuck units 197 and 198 each move in a slant direction, by which the lower the chuck units 197 and 198 get, the farther apart they get. This arrangement will be explained in detail later.

This movement in the slant directions is performed in two stages such as (i) from when the glass tube 160 comes out of the heating furnace 170 and till when the central portion 163 of the glass tube 160 abuts on the top 181 of the mandrel 180 and (ii) after the central portion 163 of the glass tube 160 abuts on the mandrel 180, the portions between the central portion 163 of the glass tube 160 and the ends 161, 162 are straightened.

More specifically, in the first stage, transition is made from the state shown in FIG. 10(*a*) to the state shown in FIG. 10(*b*). In the second stage, transition is made from the state shown in FIG. 10(*b*) to the state shown in FIG. 10(*c*).

In the first stage, the ends 161 and 162 (the chuck units 197 and 198) of the glass tube 160 coming out of the heating furnace 170 are each moved in a slant direction indicated with ①. Then, it is arranged so that, by the time the central portion 163 of the glass tube 160 abuts on the top 181 of the mandrel 180, only small sagging portions (indicated with the reference numbers "166" and "167" in FIG. 10(*b*)) remain, the sagging portions being positioned (i) between the end 161 and the supporting roller 191 and (ii) between the end 162 of and the supporting roller 192, respectively.

In the second stage, the ends 161 and 162 of the glass tube 160 are spread farther apart in slant directions indicated with ②, so that each of the portions of the glass tube 160 from the central portion 163 to the ends 161 and 162 thereof is substantially straight.

The movement of the chuck units 197 and 198 in the second stage is controlled, as shown in FIG. 11A, so that the angle between each of the straight portions 168 and 169 and the axis D of the mandrel 180 is α. In the first and second stages, it is acceptable if the speeds of the downward movement and the movement in the left-right direction are the same. Also, it is acceptable if the speeds of the movements are different in each stage.

Since the movement of the chuck units 197 and 198 in the slant directions ① and ② are controlled so as to be performed in stages, it is possible to prevent a tension load from suddenly or excessively acting on the double spiral scheduled portion Ga of the glass tube 160. Thus, for example, it is possible to inhibit the glass tube 160 from having a smaller tube diameter at the double spiral scheduled portion Ga.

Accordingly, it is possible to wind the double spiral scheduled portion Ga of the glass tube 160 around the mandrel 180 while keeping the tube diameter substantially uniform. Thus, it is possible to prevent the diameter of the glass tube 160 from becoming smaller, which was a problem in a conventional manufacturing method. Needless to say, since a tension load in the lengthwise direction acts on the glass tube 160, there is no possibility that the tube diameter becomes larger.

In addition, since the supporting rollers 191 and 192 are provided in the vicinity of the mandrel 180, even if the glass tube 160 is in a soft state, it is possible to support the double spiral scheduled portion Ga, which tends to sag, of the glass tube 160 from underneath. Because of this arrangement, as shown in FIGS. 10(*c*) and 11A, it is possible to position each of the straight portions 168 and 169 of the glass tube 160 at an angle α to the axis D of the mandrel 180 before the winding step. In other words, it is possible to position the straight portions 168 and 169 so as to be parallel to each respective winding groove 182, when viewed from a direction orthogonal to the axis of the mandrel.

(3) Winding Step a. General Outline

Figure 13A:
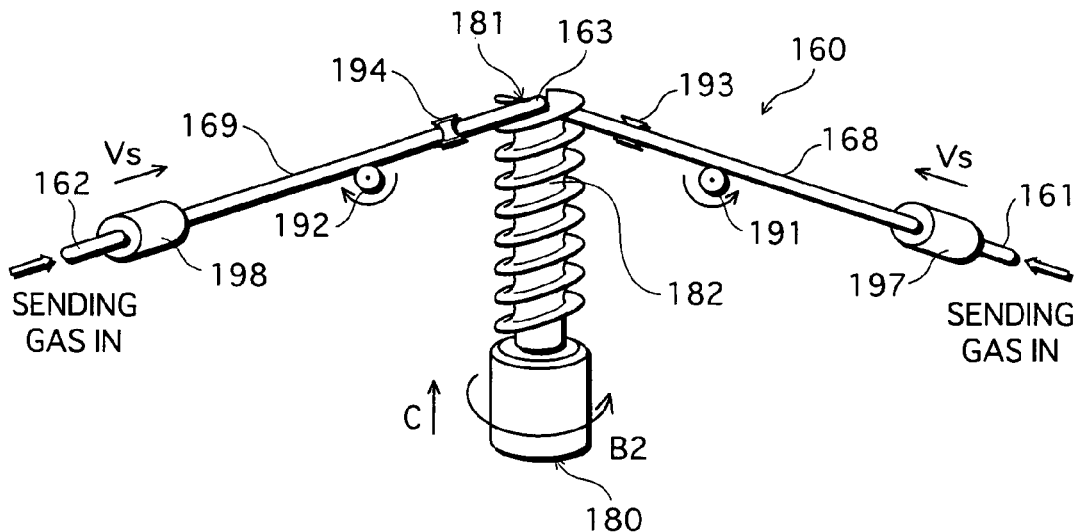
FIGS. 13A and 13B show the winding step in the manufacturing method of the present invention.

As shown in FIG. 13A, in this step, the mandrel 180 is rotated in the B2 direction so that, while the central portion 163 of the glass tube 160 placed on the top 181 of the mandrel 180 is hung and held by the hook units 183 and 184, the double spiral scheduled portion Ga of the glass tube 160 is wound along the winding grooves 182 on the periphery of the mandrel 180, so that the glass tube 160 is formed into a double spiral. Particularly, in this step, a tension load acts on the glass tube 160 during the winding process.

More specifically, as the double spiral scheduled portion Ga of the glass tube 160 is wound around the mandrel 180, the chuck units 197 and 198, which hold the ends 161 and 162 of the glass tube 160 being in a soft state respectively, move in directions to approach the mandrel 180. An arrangement is made so that the winding speed Vr (the first speed) at which the glass tube 160 is wound around the mandrel 180 is higher than the moving speed Vs (the second speed) at which the chuck units 197 and 198 move.

Figure 12A:
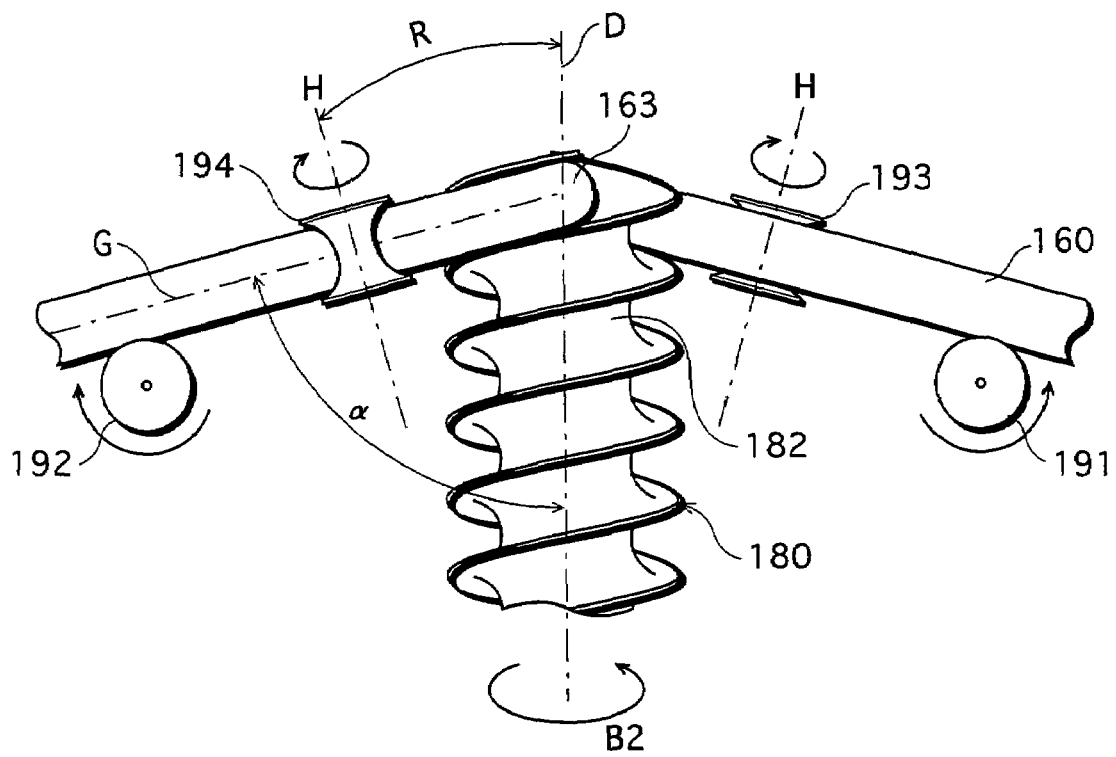
FIG. 12A is a front view that shows a glass tube starting to be wound around the mandrel.
Figure 12B:
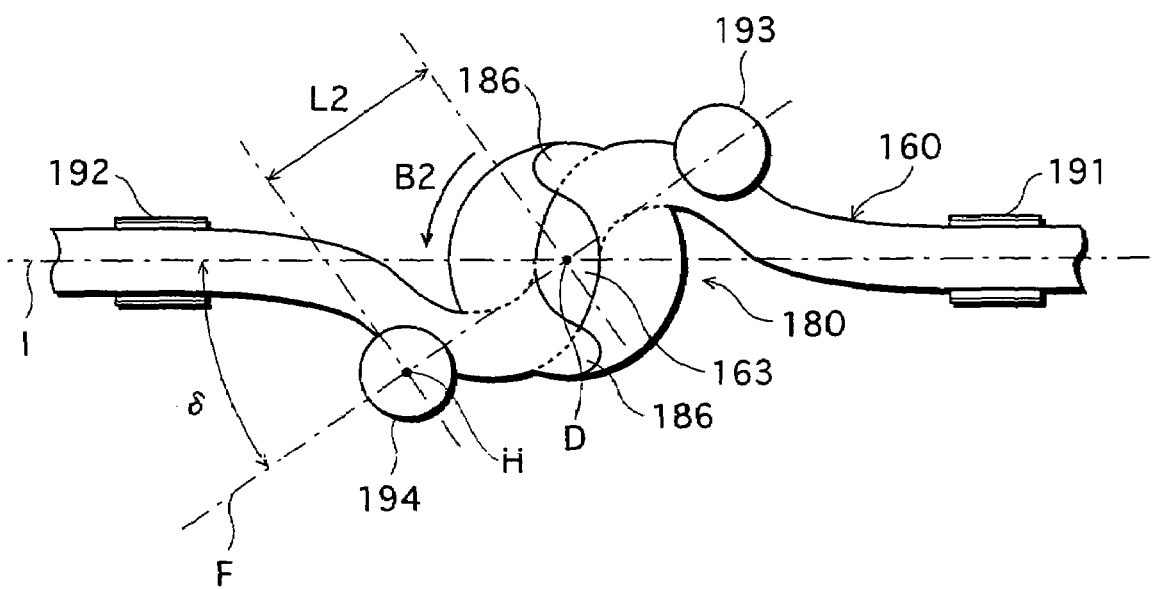
FIG. 12B is a plan view that shows a glass tube starting to be wound around the mandrel.

Further, as shown in FIGS. 12A and 12B which is to be explained later, guiding rollers 193 and 194 for guiding the double spiral scheduled portion Ga of the glass tube 160 being in a soft state into the winding grooves 182 of the mandrel 180 are provided each between the mandrel 180 and the aforementioned supporting rollers 191 and 192.

FIG. 12B is a close-up of the mandrel 180 viewed from the top 181 side, when the rotation is started. The guiding rollers 193 and 194 are positioned so that (i) as shown in FIG. 12A, the angle R at which the axis H of each of the guiding rollers 193 and 194 crosses the axis D of the mandrel 180 is "π/2−α" and also (ii) as shown in FIG. 12B, in a plan view of the mandrel and the glass tube at the beginning of the rotation, the angle between the line F that connects the axis D of the mandrel with the center H of the guiding roller 194 and the line I is δ, where the line I is a line that, in a plan view (See FIG. 12B), passes through the axis D of the mandrel and connects the axis of the portion of the glass tube held by the chuck unit 197 with the axis of the portion of the glass tube held by the chuck unit 198.

As shown in FIG. 12A, the outer wall of each of the guiding rollers 193 and 194 is depressed in the middle in an arc shape, so that the double spiral scheduled portion Ga of the glass tube 160 can be fitted to each depression.

Further, when the softened glass tube 160 is wound around the mandrel 180, as shown in FIG. 13A, a pressure gas controlled to have a constant pressure is sent into the glass tube 160 from the ends 161 and 162, so that the glass tube 160 is inflated. More precisely, when a predetermined period of time has passed after the mandrel 180 starts rotating, the pressure gas starts to be sent into the glass tube 160.

As additional information, a heater (not shown in the drawing) is incorporated into the mandrel 180 so that the temperature of the mandrel 180 is maintained constant. More specifically, the temperature of the mandrel 180 is arranged to be lower than the softening point of the glass tube 160 to be wound by 150 degrees centigrade, i.e. the temperature is "150 degrees centigrade below the softening point", and here it is arranged to be 500 degrees centigrade.

b. Explanation on the Step

Figure 13B:
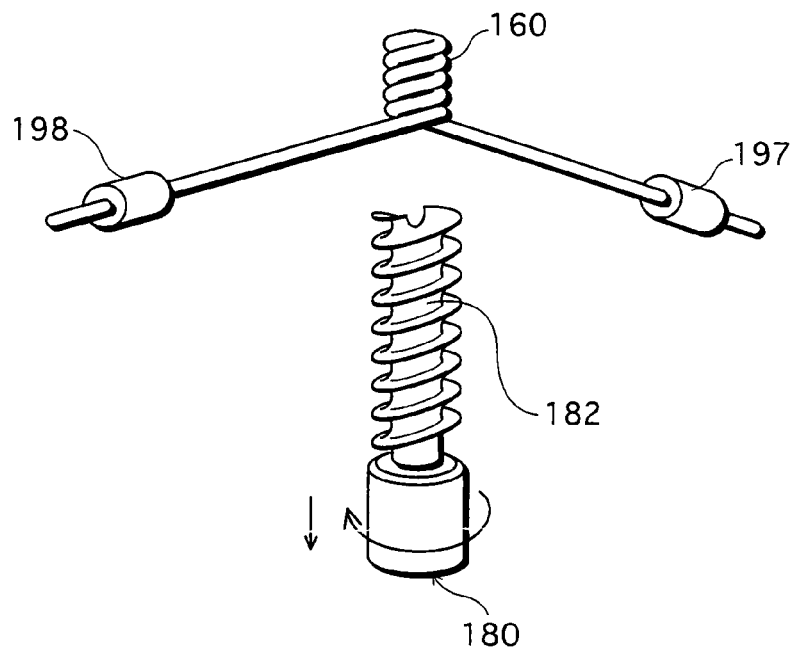

The following explains the winding step in detail, with reference to mainly FIGS. 13A and 13B.

After the central portion 163 of the glass tube 160 is placed on the top 181 of the mandrel 180 in the previous moving and placing step as shown in FIGS. 11A and 11B, the mandrel 180 is rotated on the axis D in the B2 direction as well as moved in the C direction, as shown in FIG. 13A. It should be noted that, as for the correlation between the rotation and the move, it is arranged so that the mandrel 180 is moved in the C direction by a pitch of "P2t" in FIG. 6 for every turn of the mandrel 180. It should be noted that, regardless of the winding process 160 of the glass tube 160, the positions of the guiding rollers 193, 194, and the supporting rollers 191, 192 are fixed.

The chuck units 197 and 198 each move at the moving speed Vs in the tube axis direction of the straight portions 168 and 169 of the glass tube 160, in other words, in such a direction that the softened double spiral scheduled portion Ga is supplied to the mandrel 180 at an angle α.

Figure 14:
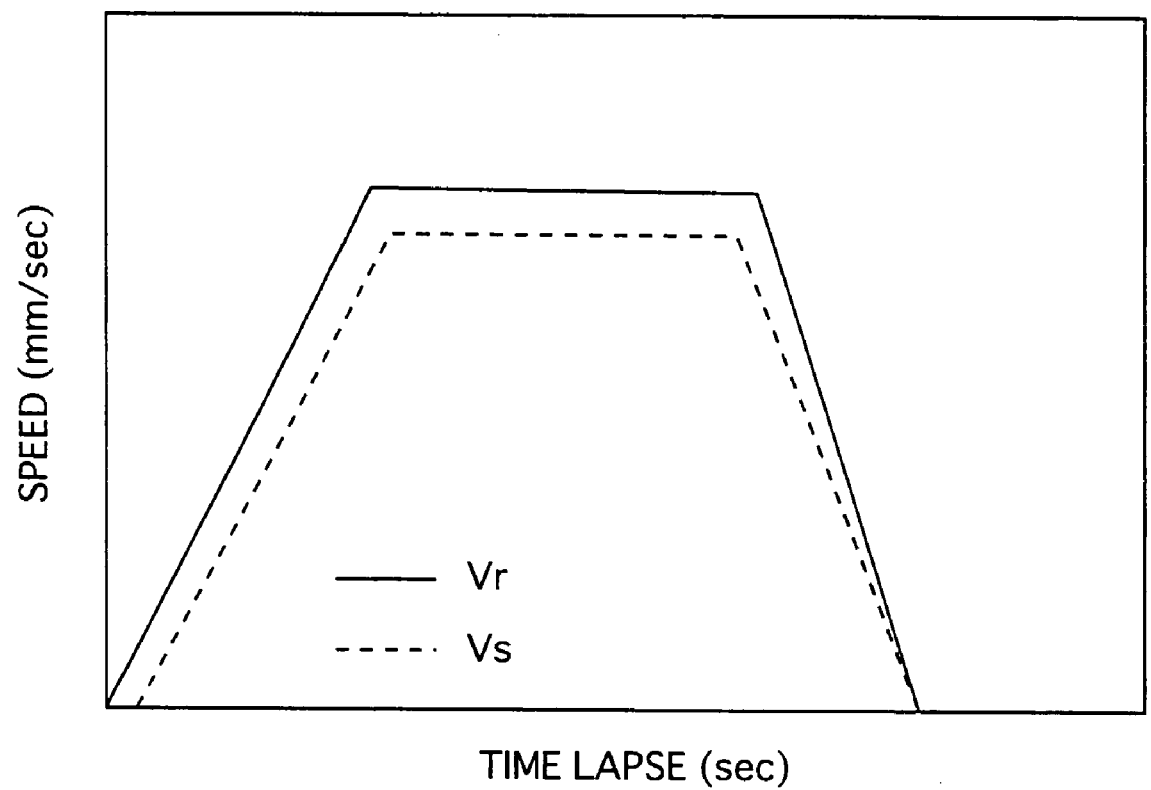
FIG. 14 shows the correlation between the winding speed and the moving speed of the chuck units and the time lapse.

FIG. 14 shows the correlation between the moving speed Vs of the chuck units 197, 198 and the winding speed Vr of the glass tube 160. With a lapse of time, both of the winding speed Vr and the moving speed Vs each linearly get higher to a predetermined speed, and the speeds are each maintained for a predetermined period of time, before the speeds each get lower until the movement and the winding both stop.

The winding speed Vr is arranged to be higher than the moving speed Vs. Also, as shown in FIG. 14, the movement of the chuck units 197 and 198 starts a little while after the glass tube 160 starts being wound.

The following explains the winding step.

Firstly, as the mandrel 180 starts rotating, the double spiral scheduled portion Ga of the glass tube 160 is hung at each of the turning units 185 (see FIGS. 7A) of the mandrel 180. At this time, although the mandrel 180 has already started to rotate, the chuck units 197 and 198 have not started to move yet, as shown in FIG. 14.

Because of this arrangement, a tension load acts on the glass tube 160 in the lengthwise direction; therefore, it is possible to inhibit loosening of the glass tube 160, which tends to occur when the rotation has started. In addition, even if portions of the double spiral scheduled portion Ga of the glass tube 160 that are hung by the hook units 183 and 184 are prone to come off the turning units 185 at the beginning of the rotation of the mandrel 180, those portions are held by the catching units 186; therefore, it is possible to prevent the glass tube 160 from coming off the mandrel 180. It should be noted that a portion of the glass tube 160 disposed between the hook unit 183 and the hook unit 184 becomes the turning part 121 of the glass tube 120 shown in FIG. 6.

At the beginning and during the winding process of the glass tube 160, as shown in FIGS. 12A and 12B, the double spiral scheduled portion Ga is guided into the winding grooves 182 of the mandrel 180 via the guiding rollers 193 and 194. As shown in FIG. 12A, the guiding rollers 193 and 194 are disposed so that the angle R at which the axis H of each of the guiding rollers 193 and 194 crosses the axis D of the mandrel 180 is "π/2−α".

Because of this arrangement, it is possible to smoothly supply the double spiral scheduled portion Ga of the glass tube 160 to the mandrel 180 at an angle α to the axis D of the mandrel 180. Accordingly, when the double spiral scheduled portion Ga of the glass tube 160 is wound around the mandrel 180, it is possible to guide the double spiral scheduled portion Ga into the winding grooves 182 without failure, as well as to avoid having the glass tube 160 deformed since there is no forceful load acting on the double spiral scheduled portion Ga. Thus, it is possible to keep the tube diameter of the double spiral scheduled portion Ga substantially uniform.

Further, the guiding rollers 193 and 194 are positioned so that the axis H of each of them is apart from the axis D of the mandrel 180 by a length of L2, in such a manner that the double spiral scheduled portion Ga of the glass tube 160 abuts on the bottom of each winding groove 182. Also, during the winding process of the glass tube 160, it is arranged so that the winding speed Vr is higher than the moving speed Vs in order to have a tension load act on the glass tube 160, as shown in FIG. 14.

Because of this arrangement, while the glass tube 160 abuts on each winding groove 182 of the mandrel 180, a tension load acts on the glass tube 160. In other words, a load acts on the glass tube 160 in such a direction that makes the glass tube 160 wind tighter. Accordingly, it is possible to make the outside diameter of the glass tube that has been formed into a double spiral uniform, and to inhibit the glass tube formed in a double spiral from having a larger outside diameter in some part, which is a problem in a conventional manufacturing method.

At the same time, it is possible to wind the glass tube 160 along the winding grooves 182 of the mandrel 180, without letting the double spiral scheduled portion Ga loose. Thus, it is possible to prevent the glass tube 160 from coming out of the winding grooves 182.

In addition, when a predetermined period of time has passed after the mandrel 180 starts rotating in the B2 direction, nitrogen gas, which is an inert gas whose pressure is controlled, is sent into the glass tube 160 from the ends 161 and 162 of the glass tube 160.

By sending nitrogen gas into the glass tube 160, it is possible to inflate the glass tube from the inside so that part of the outer surface of the glass tube 160 being wound around the mandrel 180 is in contact with each winding groove 182, the part of the outer surface of the glass tube 160 being positioned on the winding grooves 182 side.

Because of this arrangement, it is possible to arrange so that, in a cross section of the glass tube 160 being wound, the shape of the part of the glass tube 160 that is pressed against each winding groove 182 conforms to the shape of the wall surface of the winding groove 182. Especially, when the shape of each winding groove 182 in a cross sectional view is an arc, it is possible to form the glass tube 160 so that the cross sections of the glass tube 160 are circles of a substantially uniform diameter.

When the double spiral scheduled portion Ga almost finishes being wound around the mandrel 180 as explained above, while maintaining the winding speed Vr higher than the moving speed Vs, both of the winding speed Vr and the moving speed Vs are lowered gradually, until the winding and the moving both stop, as shown in FIG. 14.

As explained above, even when the winding process of the glass tube 160 comes to an end, a tension load acts on the glass tube 160 in the lengthwise direction; therefore, it is possible to prevent the glass tube 160 from becoming loose when the winding process ends and thereafter.

Accordingly, it is possible to prevent the glass tube formed into a double spiral from having a larger circumferential diameter in some part, which is a problem in a conventional manufacturing method. As additional information, the winding speed Vr and the moving speed Vs are arranged so that the ratio of the moving speed Vs to the winding speed Vr is 0.98.

(4) Removal Step

In the removal step, as shown in FIG. 13B, the mandrel 180 is rotated in the reverse direction of the one in the winding process, so that the glass tube 160 formed into a double spiral, which is wound around the mandrel 180, can be removed from the mandrel 180.

More specifically, when the temperature of the double spiral scheduled portion Ga of the glass tube 160 falls, and the portion formed into a double spiral makes transition from a soft state to a hard state, the mandrel 180 is rotated in the reverse direction of the B2 direction, and also, the mandrel 180 is moved in the reverse direction of the C direction, as shown in FIG. 13B, so that the glass tube 160, out of which the double spiral scheduled portion Ga has been formed into a double spiral, can be obtained. It should be noted that, in order to efficiently lower the temperature of the glass tube 160 being in a soft state, a pressure gas controlled to have a substantially constant pressure is sent into the glass tube 160 from the ends 161 and 162 of the glass tube 160.

While the glass tube 160 is cooled down like above, pressured gas is sent into the glass tube 160 from the ends thereof. With this arrangement, it is possible to efficiently cool down the glass tube 160. It should be noted that, by starting to send the pressured gas into the glass tube 160 immediately after the rotation of the mandrel 180 stops, or immediately before the rotation stops, it is possible to shorten the time required for cooling down the glass tube 160.

It should be also noted that the obtained glass tube goes through steps of being made into an arc tube, such as removing extra ends of the glass tube, making the ends apart from portions of the glass tube that are positioned adjacent thereto in the spiral axis direction, applying a phosphor onto the inner surface of the glass tube; however, since a publicly known technique, which is the same as in a conventional manufacturing method, is used, explanation will be omitted.

3. Comparison with a Conventional Manufacturing Method

In order to confirm the effects of the manufacturing method described above, trial mass-production was performed in which straight glass tubes were formed into double spirals, and the yield of good products were calculated. The resulting yield was 98.9%, which is an extremely high value. As mentioned in the section of "DESCRIPTION OF THE RELATED ART" above, the yield of good products by a conventional manufacturing method is approximately 50%; therefore, it is considered that the present invention provides a beneficial method of forming a straight glass tube into a double-spiral glass tube.

The present invention has been explained so far based on the embodiment. Needless to say, the present invention is not limited to the specific examples described in the embodiment above. For example, it is possible to embody the present invention in the modification examples as described below.

1. Lamps (1) Compact Self-ballasted Fluorescent Lamp

The compact Self-ballasted Fluorescent Lamp Described in the embodiment above is a type of lamp that has a globe covering the arc tube; however, it is acceptable if, for example, the compact self-ballasted fluorescent lamp does not include a globe.

Further, the compact self-ballasted fluorescent lamp described above is a type of lamp that corresponds to a 60 W incandescent lamp; however, it is acceptable if it is a type of lamp that corresponds to another kind of incandescent lamp such as one of 100 W or 40 W. It should be noted that it is possible to apply the manufacturing method of the present invention, although in each of such cases, the total number of the spiral turns made by the spiral parts of the arc tube may vary, and the length of the tube to be wound around the mandrel may also vary.

(2) Form of the Arc Tube

The arc tube described in the embodiment above is, as shown in FIG. 6, formed into a double spiral in which the portions of the glass tube from the turning part up to the both ends thereof are each wound around the spiral axis; however, it is acceptable if portions from the turning part up to certain points before the end thereof are each wound around the spiral axis, and the portions each positioned between the certain point and the respective end extend parallel to the spiral axis.

(3) Types of Lamps

In the embodiment described above, an example in which the present invention is applied to a compact self-ballasted fluorescent lamp is explained; however, it is also acceptable if the present invention is applied to other kinds of lamps, for example, a fluorescent lamp which does not include an electronic ballast, and in which a single base (e.g. GX10q, GY10q, or the like), which is not a screw-in type base (e.g. E17, E28, and the like), is used.

The following explains a single-base type compact fluorescent lamp (hereafter, it will be simply referred to as "a compact fluorescent lamp") which includes an arc tube manufactured by the aforementioned manufacturing method.

Figure 15:
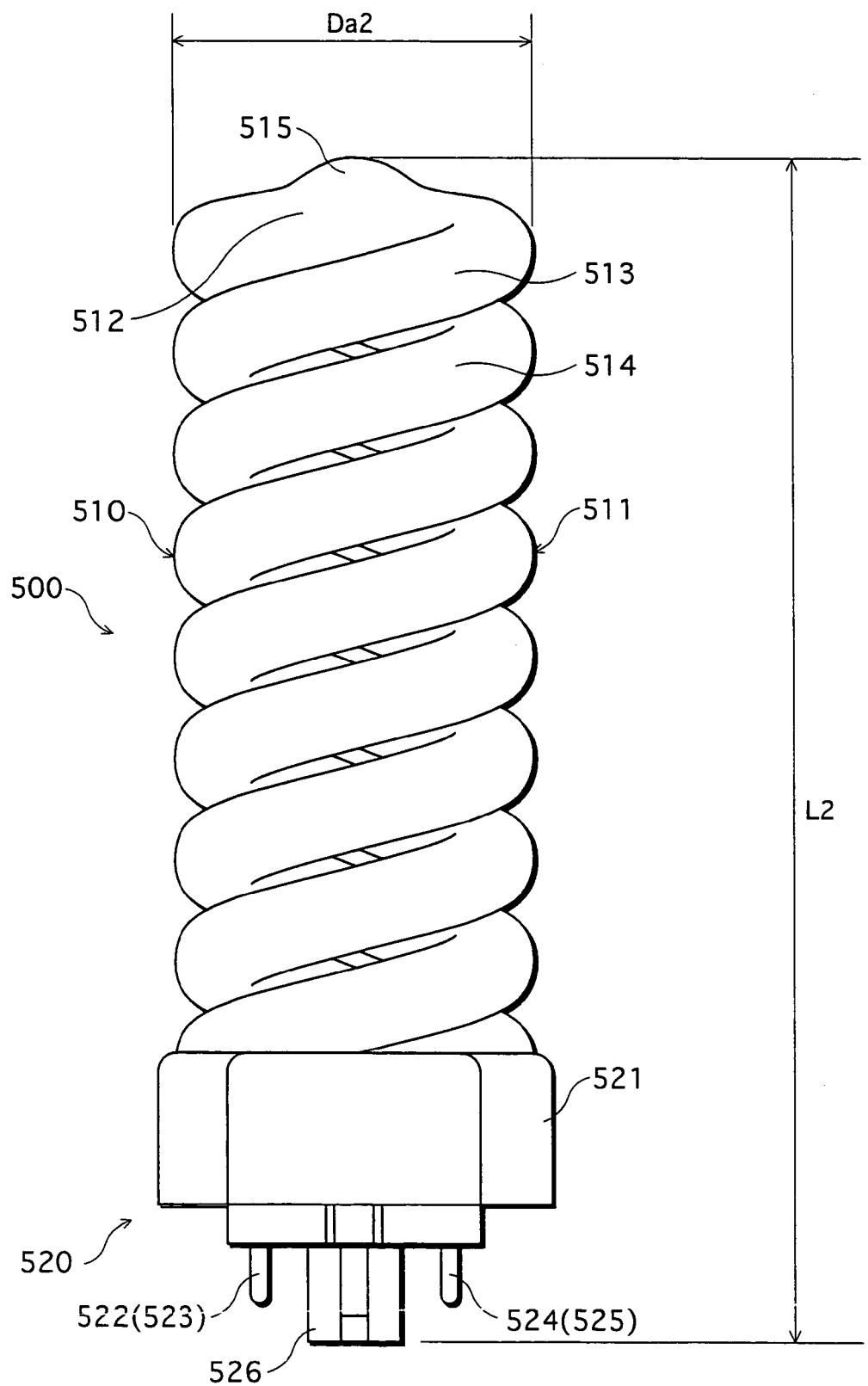
FIG. 15 is a front view of a compact fluorescent lamp including an arc tube manufactured by the manufacturing method of the embodiment.

FIG. 15 is a front view of a compact fluorescent lamp including an arc tube manufactured by the manufacturing method of the embodiment. A compact fluorescent lamp 500 in this modification example has been developed as an alternative to a compact fluorescent lamp of 32 W to 57 W (hereafter, this compact fluorescent lamp will be referred to as "a conventional compact fluorescent lamp" in order to distinguish it from the compact fluorescent lamp related to the present invention), which has the same brightness as a 150 W incandescent lamp or a low wattage HID lamp (a metal halide lamp) of 30 W to 70 W.

An arc tube used in a conventional compact fluorescent lamp has a structure in which either six straight glass tubes are joined, or three U-shaped glass tubes are joined (the so-called three-U type). The lamp efficiency is as low as approximately 75 lm/W, and there is a demand for improvement of the lamp efficiency.

(A) Overall Structure

As shown in FIG. 15, in the compact fluorescent lamp 500, an arc tube 510 formed into a double spiral is held by a resin case 521. The resin case 521 has, on a wall thereof opposite to the side on which the arc tube 510 is held, terminal pins 522, 523, 524, 525 for making connection to a power source, as well as an engagement unit 526 which can be detachably engaged with a socket (not shown in the drawing) on the power source side.

The resin case 521 is structured into a GX24q-type single base 520 with the four terminal pins 522, 523, 524, 525 and the engagement unit 526. As additional information, the compact fluorescent lamp 500 receives supply of high-frequency electric current via the single base 520.

The arc tube 510 basically has the same structure as the arc tube 110 used in the compact self-ballasted fluorescent lamp 100 described in the embodiment above, except that the total length (between the electrodes) is made longer so that the total luminous flux when the light is turned on is equal to or higher than a 150 W incandescent lamp.

The glass tube 511 which is formed into a double spiral and included in the arc tube 510 is made from one glass tube by the manufacturing method described above. The glass tube 511 has, substantially at the center thereof, a turning part 512. The portions between the turning part 512 and both ends of the glass tube are the spiral parts 513 and 514 respectively, which are each spirally wound around the spiral axis.

On the other end of the arc tube 510, which is opposite to the end on which the single base 521 is provided, a projection 515 that projects outwardly is formed. The projection 515 will have the coldest point when the lamp is turned on.

(B) Specific Structure

On the inner surface of the glass tube 511 formed into a double spiral, a phosphor, which is the same as the one used in the arc tube 110 in the compact self-ballasted fluorescent lamp 100 is applied. Also, approximately 5 mg of mercury and a buffer gas (argon in this example) with a pressure of 400 Pa are enclosed in the glass tube 511. Needless to say, electrodes are enclosed and attached at both ends of the glass tube 511. The distance between the electrodes of the arc tube 510 is 970 mm.

The inside diameter of the glass tube 511 is 7.4 mm and the outside diameter of the glass tube 511 is 9 mm. The total number of the spiral turns made by the spiral parts 513 and 514 together, which are spirally wound around the spiral axis; is ten. The circumferential diameter Da2 of the arc tube 510 is 40 mm and the total length L2 of the compact fluorescent lamp 500 is 140 mm with the single base 521 included.

(C) Lamp Performance

When the compact fluorescent lamp 500 with the aforementioned structure is turned on with a lamp input of 28 W, while being positioned with the single base 520 side up, the total luminance flux is 2380 lm, and the lamp efficiency is 85.0 lm/W. Additionally, a bulb wall loading of the arc tube 510 when the lamp is turned on is 0.12 W/cm$^2$. The rated life is approximately 11,000 hours.

As for a conventional 32 W compact fluorescent lamp, the total length of the lamp is 145 mm, and the circumferential diameter of the arc tube is 40 mm. When this lamp is turned on with a lamp input of 32 W, while being positioned with the base side up, the total luminance flux is 2400 lm, and the lamp efficiency is 75 lm/W, whereas the rated life is 10,000 hours.

Accordingly, the compact fluorescent lamp 500 that includes an arc tube manufactured by the manufacturing method of the present invention is slightly more compact than a conventional lamp in terms of the size, and realizes an improvement of lamp efficiency by 13% and an improvement of rated life by 10% in terms of the lamp performance, while having substantially the same luminous flux as a conventional lamp.

(D) Lamp Efficiency

The inventors studied about structures of arc tubes used in compact fluorescent lamps by which it is possible to improve the lamp efficiency. More specifically, the inventors investigated into the correlation between the diameters of glass tubes used in arc tubes and the lamp efficiency.

To explain in details, the lamp efficiency was measured while the inside diameter of the glass tube is varied within a range of 5.0 mm to 12 mm inclusive, and the bulb wall loading of the arc tube is set at 0.14 W/cm$^2$, whereas the lamp input is set at 28 W.

Here, the reason why the bulb wall loading of the arc tube used in this test is set at 0.14 W/cm$^2$ can be explained as follows: In a conventional compact fluorescent lamp, the bulb wall loading of the arc tube is set at 0.08 W/cm$^2$ or larger in order to maintain compactness of the lamp to some extent, and also the bulb wall loading needs to be 0.20 W/cm$^2$ or smaller, in order to achieve at least 6,000 hours of rated life. With these factors taken into consideration, the bulb wall loading is set at 0.14 W/cm$^2$ in order to make the lamp compact as well as make the life span long.

Figure 16:
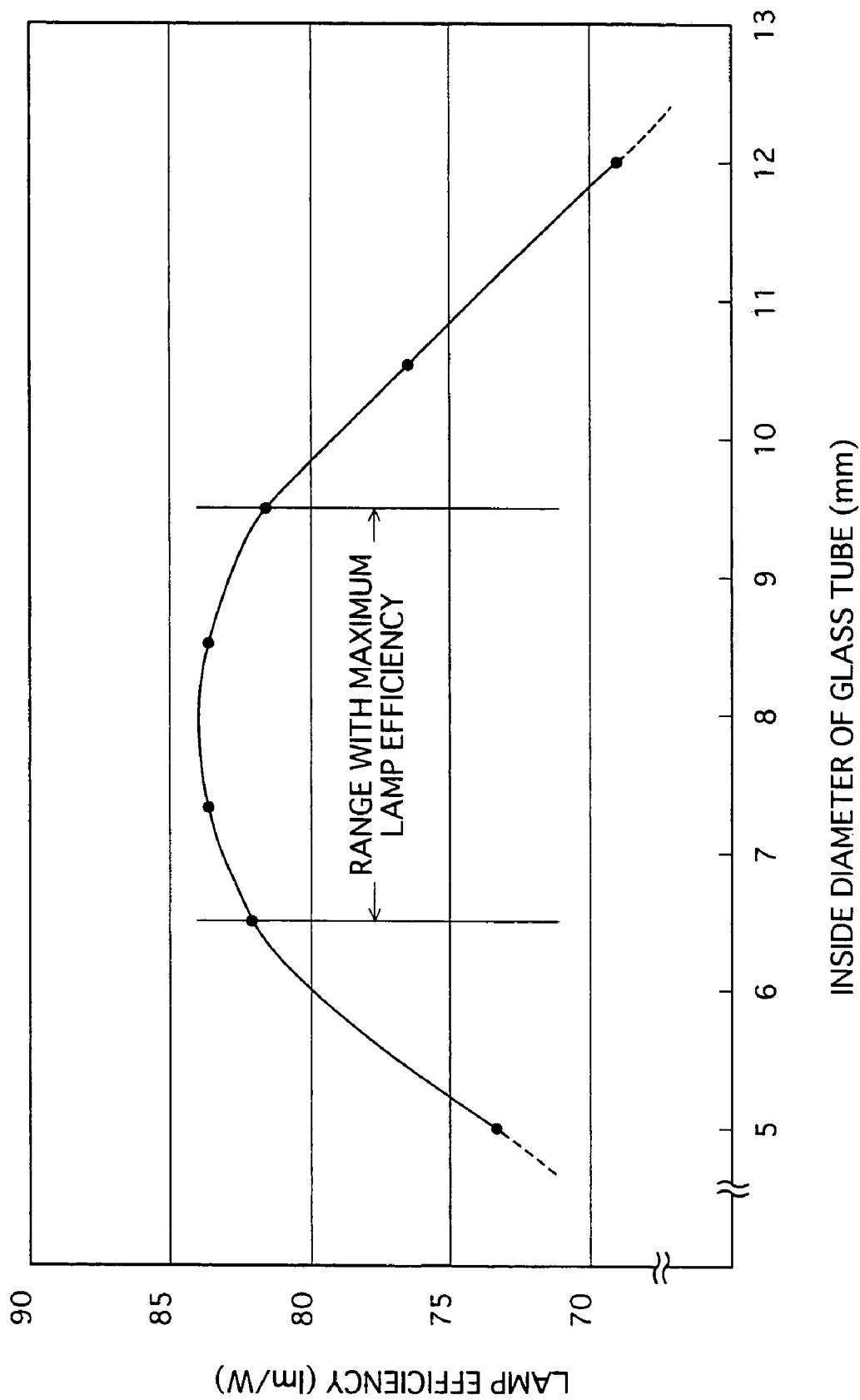
FIG. 16 shows the correlation between inside diameters of glass tubes and lamp efficiency.

FIG. 16 shows the correlation between inside diameters of glass tubes and lamp efficiency.

As shown in FIG. 16, lamp efficiency is at its maximum when the inside diameter of the glass tube is approximately 8 mm. It can be observed that lamp efficiency is not so much lower than the maximum value when the inside diameter of the glass tube is within a range of 6.5 mm to 9.5 mm. Accordingly, for this reason, a glass tube with an inside diameter of 7.4 mm is used in the arc tube of the compact fluorescent lamp, so that the lamp efficiency can be improved compared to a conventional compact fluorescent lamp.

(E) Manufacturing Method

In the field of fluorescent lamps, there are various kinds of shapes for arc tubes used in fluorescent lamps. Among those is a double spiral arc tube used in a compact self-ballasted fluorescent lamp, which is described in the embodiment above. The inventors presumed that if the arc tube of the compact fluorescent lamp explained here was formed into a double spiral, like the arc tube of a compact self-ballasted fluorescent lamp, the lamp would be more compact than a conventional three-U type lamp.

In the compact fluorescent lamp, however, the distance between the electrodes, i.e. the total length of the glass tube, is larger than the arc tube of a compact self-ballasted fluorescent lamp; therefore, when the manufacturing method explained in the "RELATED ART" section is used, it is not possible to keep the glass tube in an optimal soft state and to form the glass tube into a double spiral properly.

In other words, when the glass tube is longer, because the glass tube sways more, the period of time between when the glass tube comes out of a heating furnace and when the glass tube is placed on a mandrel is longer; therefore, the temperature of the glass tube falls before predetermined portions of the glass tube finish being wound around a mandrel, and the glass tube gets broken. On the contrary, when the heating temperature of the glass tube is raised so that the glass tube can be maintained in a soft state up to the ends thereof, there is a problem that the glass tube gets too soft, and the central portion of the glass tube gets elongated more than necessary due to its own weight.

Now, the problem occurred in the conventional manufacturing method can be solved when the manufacturing method of the present invention intended for manufacturing an arc tube of a compact self-ballasted fluorescent lamp is applied to manufacturing of an arc tube in a compact fluorescent lamp, because it is possible to move the glass tube from the heating furnace to the top of the mandrel in a smooth manner.

As additional information, a straight glass tube used for manufacturing the arc tube of the compact fluorescent lamp is 1,500 mm in length, and an intermediate portion of which, being 1,200 mm in length, is heated and wound around a mandrel. As additional information, when the total length of the glass tube is larger, a heating furnace and the like that are to be used are also larger.

2. Heating Furnace

In the embodiment described above, a tunnel-type heating furnace is used, and the tunnel has a shape like a tipped-over "L" so that a straight glass tube can be moved at first in a front-and-back direction and then in a up-and-down direction, and the glass tube gets softened especially while it-is moved downward.

It is possible, however, to embody the present invention using other types of heating furnace. For example, in the embodiment described above, it is arranged so that the tunnel extends in the front-and-back direction and the up-and-down direction; however, it is acceptable if the tunnel extends only in the up-and-down direction. Alternatively, it is also acceptable if the glass tube is not moved until the glass tube is in a soft state or until the glass tube starts coming into a soft state, and then the glass tube is perpendicularly lowered after that.

With each of these arrangements also, it is possible to have advantageous effects of being able to easily place the softened glass tube on the top of the mandrel, like in the embodiment described above, since the glass tube being in a soft state is perpendicularly lowered. More precisely, it is acceptable if the glass tube is heated, and when the central portion thereof starts sagging due to being soft, the glass tube is moved in a direction in which the central portion sags.

Further, in the embodiment described above, the glass tube is not rotated inside the heating furnace; however, it is acceptable if the glass tube is rotated on the axis while being moved, as long as the glass tube has not got soft. With this arrangement, at a certain point of the glass tube, the outer surface of the glass tube can be heated to a substantially uniform temperature.

3. Conditions of Heating

In the embodiment described above, the temperature of the heating furnace is controlled so that the temperature of the double spiral scheduled portion of the glass tube gets to 770 degrees centigrade; however, it is acceptable if the temperature of the double spiral scheduled portion of the glass tube is within a range between the softening point of the glass and "150 degrees centigrade over the softening point of the glass" inclusive.

The reason for this arrangement is that, when the temperature of the double spiral scheduled portion is lower than the softening point, viscosity of the double spiral scheduled portion is high, and it is difficult to bend the glass tube along the mandrel. On the contrary, when the temperature of the double spiral scheduled portion is higher than "150 degrees centigrade over the softening point", viscosity of the double spiral scheduled portion is low, and then, the double spiral scheduled portion sags more, and the glass tube gets loose in the winding process.

As additional information, when the temperature of a glass tube is around the softening point, it is possible to bend the glass tube to a curvature of some extent. More precisely, when the diameter of a double spiral to be formed is large, it is always possible to form it, but when the diameter of a double spiral to be formed is too small, it is not always possible to form it.

In the case explained above in the embodiment, where the diameter of the double spiral is 36.5 mm and the inside diameter $\phi i$ of the glass tube 120 is 7.4 mm, it is difficult to wind the glass tube if the temperature of the glass tube is around the softening point; therefore, it is necessary to arrange so that the temperature is within a range between "100 degrees centigrade over the softening point" and "150 degrees centigrade over the softening point" inclusive.

Further, the smaller a range within which the temperature of the double spiral scheduled portion varies in the lengthwise direction is, the better; however, it is learned that, as long as the range is within ±8 degrees centigrade inclusive, the glass tube does not elongate partially, even if a tension load acts on the glass tube in the lengthwise direction during the winding process.

When the temperature of some part of the glass tube gets higher than the aforementioned range, such a portion elongates partially during the winding process. Then, the thickness of the glass tube gets extremely small, and also the diameter of the glass tube gets smaller. Conversely, when the temperature of some part of the glass tube gets lower than the aforementioned range, such a portion gives into the tension load in the lengthwise direction during the winding process, and in a worse cases, the glass tube gets broken.

4. Placement of the Mandrel (1) Movability of the Mandrel

In the embodiment described above, the mandrel is fixed at a position beneath the softened glass tube; however, it is also acceptable that the mandrel is movable. It should be noted, however, that in such a case it is necessary to have a step of moving the mandrel to a position beneath the glass tube before the lowest position of the glass tube that starts to get soft reaches a predetermined position (the predetermined position is a position that corresponds to the top of the mandrel in a case where the mandrel is fixed beneath the glass tube).

(2) During the Placing Process of the Glass Tube

In the embodiment described above, the mandrel is disposed so that the axis thereof extends perpendicularly. The arrangement is made this way so that it is easy to place the glass tube on top of the mandrel. More specifically, in a plan view of the mandrel, the distance between the pair of hook units gets largest when the axis of the mandrel extends perpendicularly. Accordingly, as long as it is possible to place the glass tube on the top of the mandrel, the mandrel may be somewhat tilted rather than extending exactly perpendicularly.

(3) During the Winding Process of the Glass Tube

In the embodiment described above, the mandrel is disposed so that the axis thereof extends perpendicularly. The arrangement is made this way so that it is easy to wind the glass tube along the winding grooves of the mandrel. More specifically, when the axis of the mandrel extends perpendicularly, it is possible to dispose the glass tube so that it is positioned symmetrical with respect to the mandrel, around which the glass tube is to be wound. Accordingly, it is easy to control the direction and the speed of the movement of the chuck units; however, as long as it is possible to wind the glass tube around the mandrel normally, the axis of the mandrel may be tilted rather than extending exactly perpendicularly.

5. The Winding Speed and the Moving Speed

In the embodiment described above, the ratio of the winding speed to the moving speed is 1.02. In other words, the ratio of the moving speed to the winding speed is 0.98. The arrangement is made this way so that a tension load in the lengthwise direction acts on the glass tube.

However, it is acceptable if the ratio of the moving speed to the winding speed is no smaller than 0.6 and is smaller than 1.0.

The reason for this is that when the ratio of the moving speed to the winding speed is 1.0 or larger, a tension load in the lengthwise direction does not act on the glass tube, and the glass tube gets loose during the process of winding the glass tube around the mandrel, and that makes it impossible to wind the glass tube on the mandrel. On the contrary, when the ratio of the moving speed to the winding speed is smaller than 0.6, the glass tube gets elongated too much, and the thickness of the glass tube becomes small. That makes it impossible to form the glass tube because the glass tube gets cracked or broken.

As a result of performing an experiment of winding a glass tube while having an arrangement wherein the ratio of the moving speed to the winding speed is no smaller than 0.6 and is smaller than 1.0, the glass tube did not get elongated too much, and the glass tube did not get loose, either.

In the embodiment described above, there is no specific explanation provided on the moving speed and the winding speed; however, these speeds are determined based on the softness, the outside diameter, and the thickness of the glass tube, as well as the curvature of the glass tube being bent so as to be wound around the mandrel.

6. Posture of the Glass Tube

In the embodiment described above, in the softening step and the moving and placing step, the glass tube is held substantially horizontally; however, as long as it is possible to perpendicularly lower the glass tube being in a soft state, it is acceptable to hold the glass tube at an angle rather than horizontally. It should be noted, however, that when the glass tube is horizontal, it is easier to manage the sagging since a portion that sags when being soft is fixed. Also, since the sagging portion is positioned symmetrical in the lengthwise direction, with respect to the point at which the glass tube sags the most, there is an advantageous effect that it is easier to place the glass tube on the top of the mandrel.

7. Movement of the Chuck Units in the Moving and Placing Step

In the embodiment described above, after the glass tube comes out of the heating furnace, the chuck units each move in a direction that makes the ends of the glass tube farther apart from each other while perpendicularly lowering the glass tube; however it is also acceptable if the chuck units move after the softened glass tube is perpendicularly lowered until the central portion of the glass tube reaches the top of the mandrel.

8. The Supporting Rollers (1) The Number of the Supporting Rollers

In the embodiment described above, two supporting rollers are used in order to support each of the portions positioned between the central portion of the glass tube and the ends; however, the number of the supporting rollers is not limited to this. For example, it is acceptable to use two or more supporting rollers on one side. Also, the number of the supporting rollers used on each side does not have to be equal. For example, it is acceptable that one of the straight portions is supported by two supporting rollers and the other of the straight portions is supported by one supporting roller.

Additionally, it is assumed that the larger the number of the supporting rollers being used is, the better the straightness of each straight portion tend to be; however, the inventors have confirmed that, when the glass tube length is as described in this specification, with at least one supporting roller on each side, it is possible to achieve straightness at a certain level by which no problem is caused during the forming process.

(2) Shapes of the Supporting Rollers

In the embodiment described above, the shape of each supporting roller is cylindrical; however, it is acceptable to use a supporting roller whose cross section is in the shape of a "V", as long as the central portion thereof in the axis direction is not thicker than the ends thereof. Additionally, it is desirable that each of the supporting rollers rotates on the axis.

(3) Position of the Supporting Rollers

In the embodiment described above, there is no specific explanation provided on positions of the supporting rollers; however, it is acceptable if the supporting rollers are positioned so that the supporting rollers are in contact with neither of the chuck units and the guiding rollers, while the glass tube is wound around the glass tube. It should be noted that it has been confirmed by an experiment that, with the arrangement mentioned above, it is possible to support a glass tube being in a soft state in such a manner that the glass tube is substantially straight from the central portion to the ends thereof.

9. The Guiding Rollers (1) Shapes of the Guiding Rollers

In the embodiment described above, the guiding rollers used are shaped so that the outer wall of each of them is depressed in the middle in an arc shape; however, alternatively it is also acceptable if, for example, the guiding rollers are shaped so that each of them has a step-like depression where the middle of the outer wall in the axis direction is narrower than the outside diameters of the ends. Additionally, it is desirable that each of the guiding rollers rotates on the axis.

(2) Position of the Guiding Rollers

In the embodiment described above, there is no specific explanation provided on positions of the guiding rollers; however, it is acceptable if the guiding rollers are at such positions that make it possible to wind the glass tube along the winding groves of the mandrel without the glass tube being loose. The positions of the guiding rollers are determined based on the softness, the outside diameter, and the thickness of the glass tube, as well as the curvature of the glass tube being wound around the mandrel. It should be noted, however, that the guiding rollers need to be disposed between each supporting roller and the mandrel, respectively.

10. Pressure Gas Used in the Winding Process (1) Kind of Pressure Gas to be Used In the embodiment described above, nitrogen gas being an inert gas is used as a pressure gas to be sent into the glass tube during the winding process; however, it is acceptable if other kinds of gas are used. For example, helium or argon, both of which are an inert gas likewise, or air can be used. It should be noted, however, that it is desirable that an inert gas is used because a gas is sent into a glass tube being in a soft state and therefore there is a possibility that substances composing the glass tube may react to the gas.

(2) Pressure of the Pressure Gas

In the embodiment described above, there is no specific explanation provided on pressure of the pressured gas; however, the pressure is determined based on the tube diameter and the thickness of the glass tube to be used, as well as the diameter of the double spiral to be formed, in other words, the curvature of the glass tube being bent so as to be wound around the mandrel and the softness of the glass tube.

Additionally, when the pressure of the pressure gas is too high, the diameter of the glass tube gets large, and in a worse case, the glass tube gets broken. On the contrary, when the pressure is too low, the glass tube does not get inflated sufficiently, and the double spiral may be formed with deformation.

(3) Timing of Sending in the Pressure Gas

In the embodiment described above, there is no specific explanation provided on the timing at which a pressure gas is sent into the glass tube, following the beginning of the rotation of the mandrel after the glass tube being in a soft state is placed on the top of the mandrel; however, the timing is determined based on the softness of the glass tube to be used and the level of acceleration for the speed of the mandrel rotation.

It should be noted that when a pressure gas is sent into the glass tube too early, a portion of the glass tube that is placed on the top of the mandrel gets inflated too much. When a pressure gas is sent into the glass tube too late, it becomes difficult to inflate the glass tube.

(4) Sending in the Pressure Gas

In the embodiment described above, the gas is sent into the glass tube from both ends of the glass tube; however, it is also acceptable if one end of the glass tube is closed, and the gas is sent into the glass tube from the other end. It is possible to inflate the glass tube from the inside also with this arrangement.

11. Gas for Cooling Down the Glass Tube (1) Kinds of Gas

In the embodiment described above, air at normal temperature is used as a cooling gas that is sent into the glass tube when the winding process is finished; however, it is possible to use a pressure gas that is the same as the one sent into the glass tube during the winding process (nitrogen gas in the example above).

(2) Pressure of the Pressure Gas

In the embodiment above, there is no specific explanation provided on pressure of the pressured gas; however, the pressure is determined based on the tube diameter, the thickness, and the length of the glass tube to be used, as well as the diameter of the double spiral to be formed, in other words, the curvature of the glass tube being wound around the mandrel.

It should be noted that when the pressure is high, the cooling effect is also high, but there is a possibility that the glass tube may get broken due to rapid cooling. Conversely, when the pressure is low, the cooling effect is also low, and productivity gets worse because it takes longer to lower the temperature of the glass tube.

(3) Sending in the Gas

In the embodiment described above, the pressure gas is sent into the glass tube from the ends of the glass tube; however, it is also acceptable if a first end of the glass tube is kept open, and the air inside the glass tube is sucked out from the second end so that air is sent into the glass tube from the first end. Alternatively, although the gas is sent into the glass tube from both ends in the embodiment described above, it is acceptable to, for example, make one end of the glass tube open and send the gas into the glass tube from the other end.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A manufacturing method of an arc tube in which a glass tube is formed into a double spiral by winding around a mandrel comprising the steps of;
   providing a predetermined length of an elongated straight glass tube;
   supporting the respective end portions of the glass tube with an intermediate portion of the glass tube unsupported;
   heating the glass tube in a heating furnace and softening the intermediate portion of the glass tube to sag;
   lowering the heated glass tube until the sagging intermediate portion engages the mandrel with grooves representative of the double spiral configuration, the mandrel being disposed beneath the heating furnace and the sagging intermediate portion of the glass tube;
   winding the heated glass tube about the mandrel to provide the double spiral configuration; and
   removing the glass tube formed in the double spiral configuration from the mandrel.

2. The manufacturing method of an arc tube of claim 1, wherein
   the glass tube being substantially straight is heated so that a temperature of a double spiral scheduled portion is within a range between a softening point of the glass tube and 150 degrees centigrade over the softening point inclusive, the double spiral scheduled portion being such a portion of the glass tube that is to be formed into the double spiral.

3. The manufacturing method of an arc tube of claim 2, wherein
   at least one pair of supporting rollers for supporting the double spiral scheduled portion is provided in a vicinity of the mandrel, and
   the glass tube being in a soft state is substantially perpendicularly lowered so that the glass tube is disposed across the pair of supporting rollers.

4. The manufacturing method of an arc tube of claim 1, wherein
   the glass tube being substantially straight is heated so that a temperature of a double spiral scheduled portion varies in a lengthwise direction within a range of ±8 degrees centigrade of a heating target temperature inclusive, the double spiral scheduled portion being such a portion of the glass tube that is to be formed into the double spiral.

5. The manufacturing method of an arc tube of claim 1, wherein
   the mandrel is disposed beneath a substantially center of a double spiral scheduled portion, which is such a portion of the glass tube that is to be formed into the double spiral, and
   an axis of the mandrel extends substantially perpendicularly.

6. The manufacturing method of an arc tube of claim 1, wherein the glass tube, being substantially straight, is held by ends thereof so that a tube axis of the glass tube is substantially horizontal.

7. The manufacturing method of an arc tube of claim 1, wherein while the glass tube is substantially perpendicularly lowered, a portion in a vicinity of a center of a double spiral scheduled portion sags downward, the double spiral scheduled portion being such a portion of the glass tube that is to be formed into the double spiral.

8. The manufacturing method of an arc tube of claim 1, wherein a double spiral scheduled portion, which is such a portion of the glass tube that is to be formed into the double spiral, is positioned parallel with the winding grooves when viewed from a direction orthogonal to an axis of the mandrel, before the double spiral scheduled portion is wound along the winding grooves.

9. The manufacturing method of an arc tube of claim 8 wherein ends of the glass tube being in a soft state are held by chuck units which each move toward the mandrel as the glass tube is wound around the mandrel, and a first speed at which the glass tube is wound around the mandrel in the winding step is higher than a second speed at which the chuck units move.

10. The manufacturing method of an arc tube of claim 9, wherein the glass tube being in the soft state is guided into winding grooves of the mandrel by a pair of guiding rollers provided in a vicinity of the mandrel.

11. The manufacturing method of an arc tube of claim 10, wherein the pair of guiding rollers is positioned so that an axis of each guiding roller is inclined at an angle of $\pi/2-\alpha$ to an axis of the mandrel, where $\alpha$ is an angle at which each of the winding grooves is inclined to the axis of the mandrel.

12. The manufacturing method of an arc tube of claim 1, wherein the glass tube being in a soft state is guided into winding grooves of the mandrel by a pair of guiding rollers provided in a vicinity of the mandrel.

13. The manufacturing method of an arc tube of claim 12, wherein the pair of guiding rollers is positioned so that an axis of each guiding roller is inclined at an angle of $\pi/2-\alpha$ to an axis of the mandrel, where $\alpha$ is an angle at which each of the winding grooves is inclined to the axis of the mandrel.

14. The manufacturing method of an arc tube of claim 1, wherein while the glass tube is wound in the winding step, a gas for inflating the gas tube is sent into the glass tube being hung and held on the top of the mandrel, and when the glass tube finishes being wound, a gas for cooling down the glass tube is sent into the glass tube.

15. The manufacturing method of an arc tube of claim 1 further comprising applying a tension force to the intermediate portion of the glass tube to maintain a constant glass tube diameter when the heated glass tube is being wound about the mandrel.

16. The manufacturing method of an arc tube of claim 15 wherein the tension force is applied by aligning the end portion of the glass tube with an angle of a spiral part of the double spiral configuration and maintaining a ratio of a moving speed of the end portions toward the mandrel to a winding speed of the mandrel from 0.6 to less than 1.0.

17. The manufacturing method of an arc tube of claim 1 further comprising applying a gas pressure into the glass tube when the heated glass tube is being wound about the mandrel.

* * * * *